United States Patent
Amano et al.

(10) Patent No.: US 6,901,307 B2
(45) Date of Patent: May 31, 2005

(54) DIE MODIFICATION ESTIMATE SYSTEM AND PROGRAM

(75) Inventors: Hikaru Amano, Tokyo (JP); Katsuji Morita, Kanagawa (JP); Daiho Sakuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 10/464,759

(22) Filed: Jun. 19, 2003

(65) Prior Publication Data
US 2004/0039475 A1 Feb. 26, 2004

(30) Foreign Application Priority Data
Jun. 20, 2002 (JP) .......................................... 2002-179687

(51) Int. Cl.[7] .......................... B22C 13/16; G06F 17/60
(52) U.S. Cl. .......................... 700/159; 700/95; 700/117; 164/80; 703/1
(58) Field of Search ........................ 700/95, 117, 159; 76/4; 164/80, 305; 706/45, 59; 703/1

(56) References Cited

U.S. PATENT DOCUMENTS 5,463,555 A * 10/1995 Ward et al. ................... 700/96
6,353,768 B1 * 3/2002 Karafillis et al. ............. 700/97
6,560,499 B1 * 5/2003 Demmer ...................... 700/97

\* cited by examiner

*Primary Examiner*—Jayprakash N. Gandhi
(74) *Attorney, Agent, or Firm*—Oblon, Spivak, McClelland, Maier & Neustadt, P.C.

(57) ABSTRACT

A die modification estimate system comprises a first unit which acquires contents of modification of a die specified by using an input unit. A second unit reads respective reference values for cost estimation, according to the specified contents of the die modification, from a storage unit. A third unit reads respective estimate functions of cost items according to the specified contents of the die modification, from the storage unit. A fourth unit calculates an estimated cost of each of the cost items based on a corresponding one of the reference values and a corresponding one of the estimate functions. A fifth unit stores the estimated costs in the storage unit. A sixth unit calculates a total amount of the estimated costs read from the storage unit. A seventh unit outputs the total amount of the estimated costs to an output unit.

18 Claims, 40 Drawing Sheets

MATERIAL INFO

[BEFORE CHANGE] [AFTER CHANGE] [DIFFERENCE] [RATIO]

PART PRICE 9.75 YEN → 0.00 YEN 0 YEN 0 %

MATL PRICE 4.79 YEN → 0.00 YEN 0 YEN 0 %

MATL NAME POM  PRODUCT NAME DURACON SW01 N HB

DIMENSIONS

LENGTH 46.500 mm  WIDTH 41.000 mm  DEPTH 35.000 mm — f1

VOLUME 7,500.000 mm3 — f2

WEIGHT 10.650 g — f3  CALC. VOL. FROM WEIGHT

SPOOL RUNNER WEIGHT 3.20 g (30.5%) — f4  VOL. INPUT — f6

PROJECTION AREA 1,906.500 mm2 — f7

RETURN | CANCEL | PROCESS DWG | CALC | HELP

FIG.5

| MATERIAL INFO | | | | | | |
|---|---|---|---|---|---|---|
| [BEFORE CHANGE] | | [AFTER CHANGE] | | [DIFFERENCE] | [RATIO] | |
| PART PRICE | 9.75 YEN | → PART PRICE | 0.00 YEN | 0 YEN | 0 % | |
| MATL PRICE | 4.79 YEN | → MATL PRICE | 0.00 YEN | 0 YEN | 0 % | |

[ RETURN ]
[ CANCEL ]
[ CALC ]
[ HELP ]

| PROCESS NAME | | C/T COST CENTER | D. | SPECIFIED COST CENTER | PLACES | PROCESS EXPENSE |
|---|---|---|---|---|---|---|
| MOLDING | ▶ | MOLD. 220t (COLD) | ☐ | MOLD. 220t (COLD) ▶ | 0 | 0.00 |
| | ▶ | | ☐ | ▶ | 1 | 0.00 |
| | ▶ | | ☐ | ▶ | 0 | 0.00 |
| | ▶ | | ☐ | ▶ | | |
| | ▶ | | ☐ | ▶ | | |
| | ▶ | | ☐ | ▶ | | |
| | ▶ | | ☐ | ▶ | | |
| | ▶ | | ☐ | ▶ | | |
| | ▶ | | ☐ | ▶ | | |

[ DELETE ]

<CAD TYPE SELECTION>
○ SIGMA-M SYSTEM  ● RAMDA SYSTEM  ○ MCAD SYSTEM  ○ CAD NOT USED

PART NO. [ ]  SUFFIX [ ]

CAD INFO
CANCEL
HELP

<ESSENTIAL INPUT ITEMS>
PART TYPE [▼ OTHER]
MONTHLY LOT [12,000] pieces/month  TOTAL LOT [288,000] pieces <DIMENSIONS>
LENGTH [ ] mm  WIDTH [ ] mm  DEPTH [ ] mm

CALC

FIG.9

MOLD DIE MODIFICATION COST LIST

PART NO. [A ...]  PRODUCTION PLACE [JAPAN]
PART NAME [LEVER; EJECT. TOP]

TOTAL LOT [... ] pieces   NO. OF PIECES [ ]   FACILITY [MOLD. 220t (COLD)]

[CLOSE]
[PRINT (HARDCOPY)]

DIE MODIFICATION COST [...] YEN
├─ MATL [...] YEN
├─ PROCESS [0] YEN
├─ DESIGN/PROGRAM [0] YEN
├─ MACHINING [0] YEN
├─ POLISHING [...] YEN
├─ BREAKUP/ASSY/ARRN [...] YEN = BREAKUP [...] YEN [...][h] + ASSY/ARRN [...] YEN
├─ TRY/MEASURE [...] YEN = TRY [...] YEN [...][h] + MEASURE [...] YEN
├─ TRY MATL [...] YEN
├─ MANAGEMENT [...] YEN = G.M.S. [...] YEN + M.C. [...] YEN
└─ PROFITS [...] YEN

⟨DETAILS OF MATL. EXPENSE AND MACHINING TIME⟩

| | SHAPE CHANGE | MATL LIST | STEEL EXP. | ELECTR. EXP | P.S.P. EXP | MACHIN | MILLING | E.D. | WIRE-CUT | S.G.M | B.D.M. | HAND-TAP |
|---|---|---|---|---|---|---|---|---|---|---|---|---|
| 1 | SHAPE CHANGE | | ... | ... | ... | ... | ... | ... | ... | ... | ... | ... |
| 2 | | | | | | | | | | | | |
| 3 | | | | | | | | | | | | |
| 4 | | | | | | | | | | | | |
| 5 | TOTAL | | ... | | | | ... | | | | ... | ... |
| 6 | | | | | | | | | | | | |

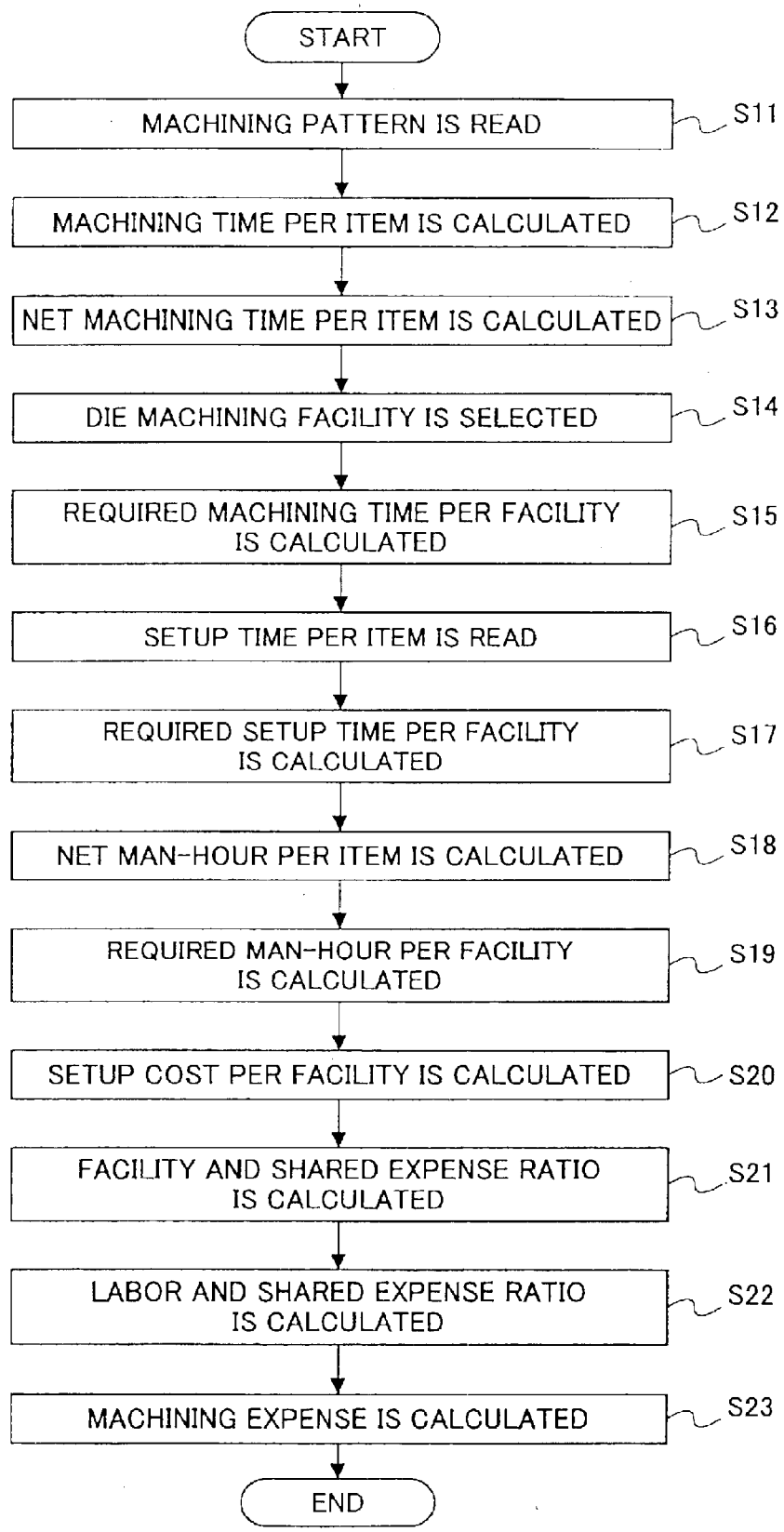

FIG.11

| SHAPE \ ITEM | PROCESS | ADD | DELETE | EXPAND | REDUCE | CHANGE | MOVE |
|---|---|---|---|---|---|---|---|
| RIB | (1) | RIB-SHAPE | INSERT-NEW | RIB-SHAPE | INSERT-NEW | INSERT-NEW | |
| | (2) | – | MC-SHAPE | – | RIB-SHAPE | RIB-SHAPE | |
| ROUND HOLE | (1) | HOLE-SHAPE | MC-SHAPE | HOLE-SHAPE | EDM-SHAPE | | HOLE-SHAPE |
| | (2) | – | – | – | – | | – |
| HOLE | (1) | INSERT-NEW | MC-SHAPE | INSERT-NEW | EDM-SHAPE | INSERT-NEW | INSERT-NEW |
| | (2) | – | – | MC & EDM | – | MC & EDM | |
| BOSS | (1) | BOSS-SH | INSERT-NEW | EDM-SH | INSERT-NEW | INSERT-NEW | INSERT-NEW |
| | (2) | – | MC-SHAPE | – | BOSS-SH | BOSS-SH | BOSS-SH |
| MATL LIST | (1) | | INSERT-NEW | | | MATL-LIST-SH | |
| | (2) | | INSERT-NEW | | | – | |
| LOUVER | (1) | LVR-SHAPE | INSERT-NEW | EDM-SH | INSERT-NEW | INSERT-NEW | INSERT-NEW |
| | (2) | LVR-SHAPE | MC & EDM | – | MC & EDM | MC & EDM | MC & EDM |
| PROJ. SHAPE | (1) | EDM-SH | EDM-SH | EDM-SH | EDM-SH | INSERT-NEW | INSERT-NEW |
| | (2) | – | MC & EDM | – | – | MC & EDM | MC & EDM |
| RECES. SHAPE | (1) | INSERT-NEW | INSERT-NEW | INSERT-NEW | INSERT-NEW | INSERT-NEW | |
| | (2) | MC & EDM | – | MC & EDM | MC & EDM | MC & EDM | |
| SLIDE CORE | (1) | S.C.-NEW | | | | | |
| | (2) | MC & EDM | | | | | |
| LOOSE CORE | (1) | L.C.-NEW | | | | | |
| | (2) | MC & EDM | | | | | |

FIG.12

| ITEM | FORMULA | CONDITIONS | | CLASS | SETUP |
|---|---|---|---|---|---|
| INS.MATL | INS.MATL | L= L-VALUE + 10 | | MATL EXP | — |
| | | W= W-VALUE + 10 | | | |
| | | D= H-VALUE + 25 | | | |
| HEX.MC | MIL. TIME | L= L-VALUE + 10 | | MC EXP | 6 |
| | | W= W-VALUE + 10 | | | |
| | | D= H-VALUE + 25 | | | |
| TAP MC | MC DRI. TIME | CENTER HOLE | 4 PLACES | MC EXP | 1 |
| | | PREP. HOLE | 4 PLACES | | |
| | | | THICK = 15 | | |
| | | | DIA = 7 | | |
| | | TAP | 4 PLACES | | |
| | | | THICK = 9 | | |
| | | | DIA = 8 | | |
| HEX FIN | S.G.M TIME | L= L-VALUE + 10 | | MC EXP | 6 |
| | | W= W-VALUE + 10 | | | |
| | | D= H-VALUE + 25 | | | |
| TH. HOLE C.BORE | MC DRI. TIME | CENTER HOLE | 4 PLACES | MC EXP | 1 |
| | | PREP. HOLE | 4 PLACES | | |
| | | | THICK = 33 | | |
| | | | DIA = 9 | | |
| | | C. BORE | 4 PLACES | | |
| | | | THICK = 9 | | |
| | | | DIA = 14 | | |
| C.SINK | MC C.S. TIME | L = L-VALUE + 10 | | MC EXP | 1 |
| | | W= W-VALUE + 10 | | | |
| | | D= H-VALUE + 25 | | | |
| | | MATL= P.H. STEEL | | | |
| ELEC. FOR C.FIN. | B.ELEC. MATL | L = L-VALUE + 10 | | MATL EXP | — |
| | | W= W-VALUE + 25 | | | |
| | | THICK = 10 | | | |
| | | x 2 (2 PIECES) | | | |
| ELEC. FOR C.FIN. | WC TIME | LENGTH= {10+(H-VALUE+25)x2} | | MC EXP | 1 |
| | | THICK = 10 | | | |
| | | x 2 (2 PIECES) | | | |
| E.D. FOR C.FIN. | E.D. ROU. TIME | L = 0.8 | | MC EXP | 1 |
| | | W= 0.8 | | | |
| | | THICK = H-VALUE + 25 | | | |
| | | x 4 (CORNERS) | | | |
| E.D. FIN. FOR C.FIN. | E.D. ROU. MATL | L = 0.8 | | | |
| | | W= 0.8 | | | |
| | | THICK = H-VALUE + 25 | | | |
| | | x 4 (CORNERS) | | | |
| POL. | POL. TIME (INSERT) | L = L-VALUE + 10 | | POL. EXP | 1 |
| | | W = W-VALUE + 10 | | | |

FIG.13

| ITEM | FORMULA | CONDITIONS | | CLASS | SETUP |
|---|---|---|---|---|---|
| ELEC. MATL | ELEC. MATL | L= L-VALUE | | MATL EXP | — |
| | | x 2 (2 PIECES) | | | |
| ELEC. MC | W.C. TIME | L = {L-VALUE + (H-VALUE+20)x2] | | MC EXP | 1 |
| | | THICK = 5 | | | |
| | | x 2 (2 PIECES) | | | |
| E.D. ROUGH | E.D. ROUGH TIME | L= L-VALUE | | MC EXP | 1 |
| | | W= W-VALUE | | | |
| | | D= H-VALUE | | | |
| E.D. FINISH | E.D. FINISH TIME | L= L-VALUE | | MC EXP | 1 |
| | | W= W-VALUE | | | |
| | | D= H-VALUE | | | |
| POLISH | POLISH TIME (SHAPE) | L= L-VALUE | | POL. EXP | 1 |
| | | W= W-VALUE | | | |
| | | D= H-VALUE | | | |

FIG.14

| ITEM | FORMULA | CONDITIONS | | CLASS | SETUP |
|---|---|---|---|---|---|
| C.H. DRILL | MC DRILL TIME | CENTER HOLE | 1 PLACE | MC EXP | 1 |
| P.H. DRILL | MC DRILL TIME | PREPARED HOLE | DIA = L-VALUE | MC EXP | |
| | | | THICK= H-VALUE | | |
| | | | 1 PLACE | | |
| BOSS SH FINISH | MC 3D TIME | L = L-VALUE | | MC EXP | 1 |
| | | W = W-VALUE | | | |
| | | D = H-VALUE | | | |
| | | MATL = PRE-HARDENED STEEL | | | |
| POLISH | POLISH TIME (SHAPE) | L= L-VALUE | | POL. EXP | 1 |
| | | W= W-VALUE | | | |
| | | D= H-VALUE | | | |

FIG.15

| ITEM | FORMULA | CONDITIONS | | CLASS | SETUP |
|---|---|---|---|---|---|
| INS.PIN | INS. PIN MATL | DIA= L-VALUE + 10 | | MATL EXP | — |
| C. HOLE DRILL | MC DRILL TIME | CENTER HOLE | L= L-VALUE+10 | MC EXP | 2 |
| P. HOLE DRILL | MC DRILL TIME | PREPARED HOLE | 1 PLACE | MC EXP | |
| | | | THICK = 33 | | |
| | | | 1 PLACE | | |
| E. MILL | MC DRILL TIME | C. BORE | DIA = L-VALUE − 0.2 | MC EXP | |
| | | | THICK = 33 | | |
| | | | 1 PLACE | | |
| REAMER | MC DRILL TIME | REAMER | 1 PLACE | MC EXP | |
| | | | THICK = H-VALUE | | |
| | | | DIA = L-VALUE + 0.01 | | |
| INVERSE DRILL | MC DRILL TIME | P. HOLE | 1 PLACE | MC EXP | |
| | | | THICK = 33 | | |
| | | | DIA = L-VALUE + 1 | | |
| INVERSE E. MILL | MC DRILL TIME | C.BORE | 1 PLACE | MC EXP | |
| | | | THICK = 33 | | |
| | | | DIA = L-VALUE + 6 | | |
| POLISH | POLISH TIME (SHAPE) | L= L-VALUE | | POL. EXP | 1 |
| | | W= W-VALUE | | | |
| | | D= H-VALUE | | | |

FIG. 16

| ITEM | FORMULA | CONDITIONS | | CLASS | SETUP |
|---|---|---|---|---|---|
| INS.MATL | INS.MATL | L= L-VALUE + 2 | | MATL EXP | - |
| | | W= W-VALUE + 2 | | | |
| | | D= H-VALUE + 25 | | | |
| HEX.MC | MIL. TIME | L= L-VALUE + 10 | | MC EXP | 6 |
| | | W= W-VALUE + 10 | | | |
| | | D= H-VALUE + 25 | | | |
| TAP MC | MC DRI. TIME | CENTER HOLE | 4 PLACES | MC EXP | 1 |
| | | PREP. HOLE | 4 PLACES | | |
| | | | THICK = 15 | | |
| | | | DIA = 8 | | |
| | | TAP | 4 PLACES | | |
| | | | THICK = 15 | | |
| | | | DIA = 8 | | |
| HEX FIN | S.G.M TIM | L = L-VALUE + 2 | | MC EXP | 6 |
| | | W = W-VALUE + 2 | | | |
| | | D = H-VALUE + 25 | | | |
| TH. HOLE C.BORE | MC DRI. TIME | CENTER HOLE | 1 PLACE | MC EXP | 1 |
| | | PREP. HOLE | 4 PLACES | | |
| | | | THICK = 33 | | |
| | | | DIA = 9 | | |
| | | C. BORE | 4 PLACES | | |
| | | | THICK = 9 | | |
| | | | DIA = 14 | | |
| C.SINK | MC C.S. TIME | L = L-VALUE + 2 | | MC EXP | 1 |
| | | W= W-VALUE + 2 | | | |
| | | D= H-VALUE + 25 | | | |
| | | MATL= P.H. STEEL | | | |
| ELEC. FOR C.FIN. | B.ELEC. MATL | L = L-VALUE + 10 | | MC EXP | - |
| | | W= W-VALUE + 2 | | | |
| | | THICK = 25 | | | |
| | | x 2 (2 PIECES) | | | |
| ELEC. FOR C.FIN. | WC TIME | LENGTH= {10+(H-VALUE+25)x2} | | MC EXP | 1 |
| | | THICK = 10 | | | |
| | | x 2 (2 PIECES) | | | |
| E.D. FOR C.FIN. | E.D. ROU. TIME | L = 0.8 | | MC EXP | 1 |
| | | W= 0.8 | | | |
| | | THICK = H-VALUE + 25 | | | |
| | | x 4 (CORNERS) | | | |
| E.D. FIN. FOR C.FIN. | E.D. FIN. MATL | L = 0.8 | | MC EXP | |
| | | W= 0.8 | | | |
| | | THICK = H-VALUE + 25 | | | |
| | | x 4 (CORNERS) | | | |
| LVR SHAPE | MC RIB TIME | LENGTH = (L-VALUE + 2) | | MC EXP | 1 |
| | | THICK = W-VALUE + 2 | | | |
| RIB SH (MC) | MC RIB TIME | RIB LENGTH = (L-VALUE + 2) | | MC EXP | 1 |
| | | RIB WIDTH = 1.5 | | | |
| | | RIB DEPTH = 3 | | | |
| | | x (NO. OF RIBS) = (W-VALUE + 2)/7 | | | |
| POL. | POL. TIME (INSERT) | L = L-VALUE + 2 | | POL. EXP | 1 |
| | | W = W-VALUE + 2 | | | |

FIG.17

| ITEM | FORMULA | CONDITIONS | | | CLASS | SETUP |
|---|---|---|---|---|---|---|
| INS.MATL | INS.MATL | L= L-VALUE + 10 | | | MATL EXP | — |
| | | W= W-VALUE + 10 | | | | |
| | | D= H-VALUE + 25 | | | | |
| HEX.MC | MIL. TIME | L= L-VALUE + 10 | | | MC EXP | 6 |
| | | W= W-VALUE + 10 | | | | |
| | | D= H-VALUE + 25 | | | | |
| TAP MC | MC DRL. TIME | CENTER HOLE | 4 PLACES | | MC EXP | 1 |
| | | PREP. HOLE | 4 PLACES | | | |
| | | | THICK = 15 | | | |
| | | | DIA = 8 | | | |
| | | C.BORE | 4 PLACES | | | |
| | | | THICK = 15 | | | |
| | | | DIA = 8 | | | |
| HEX FIN | S.G.M TIME | L = L-VALUE + 10 | | | MC EXP | 6 |
| | | W = W-VALUE + 10 | | | | |
| | | D = H-VALUE + 25 | | | | |
| MATL LIST LETTER | MC 3D TIME | L = L-VALUE + 10 | | | MC EXP | 2 |
| | | W = W-VALUE + 10 | | | | |
| | | D = H-VALUE + 3 | | | | |
| | | MATL = PRE-HARDENED STEEL | | | | |
| POL. | POL. TIME (INSERT) | L = L-VALUE + 10 | | | POL. EXP | 1 |
| | | W = W-VALUE + 10 | | | | |

FIG.18

| ITEM | FORMULA | CONDITIONS | CLASS | SETUP |
|---|---|---|---|---|
| MC 3D SHAPE | MC 3D | L= L-VALUE + 10<br>W= W-VALUE + 10<br>D= H-VALUE + 5<br>MATL = PRE-HARDENED STEEL | MC EXP | 1 |
| ELEC. MATL | B.ELEC. MATL | L = L-VALUE + 10<br>W = W-VALUE + 10<br>D = H-VALUE + 25 | MATL EXP | — |
| ED ELEC. SHAPE | MC 3D TIME | L = L-VALUE + 10<br>W = W-VALUE + 10<br>D = H-VALUE + 5<br>MATL = COPPER | MC EXP | 1 |
| ED FIN. | ED FIN. TIME | L = L-VALUE<br>W = W-VALUE<br>D = H-VALUE | MC EXP | 1 |
| POL. | POL. TIME (SHAPE) | L = L-VALUE<br>W = W-VALUE<br>D = H-VALUE | POL. EXP | 1 |

FIG.19

| ITEM | FORMULA | CONDITIONS | CLASS | SETUP |
|---|---|---|---|---|
| MC 3D SHAPE | MC 3D TIME | L= L-VALUE + 10<br>W= W-VALUE + 10<br>D= H-VALUE + 5<br>MATL = PRE-HARDENED STEEL | MC EXP | 1 |
| POL. | POL. TIME (SHAPE) | L = L-VALUE + 10<br>W = W-VALUE + 10<br>D = H-VALUE + 5 | POL. EXP | 1 |

FIG.20

| ITEM | FORMULA | CONDITIONS | CLASS | SETUP |
|---|---|---|---|---|
| ITEM ED ELEC. | B. ELEC. MATL | L= L-VALUE - 10 | MATL EXP | — |
| | | W= W-VALUE + 10 | | |
| | | D= H-VALUE + 25 | | |
| | | x 2 (2 PIECES) | | |
| ED ELEC. SHAPE | MC 3D TIME | L= L-VALUE + 10 | MC EXP | 2 |
| | | W= W-VALUE + 10 | | |
| | | D= H-VALUE + 25 | | |
| | | MATL = COPPER | | |
| | | x 2 (2 PIECES) | | |
| 3D SHAPE ROUGH | ED ROUGH TIME | L= L-VALUE | MC EXP | 1 |
| | | W= W-VALUE | | |
| | | D= H-VALUE | | |
| 3D SHAPE FINISH | ED FINISH TIME | L= L-VALUE | MC EXP | 1 |
| | | W= W-VALUE | | |
| | | D= H-VALUE | | |
| POLISH | POLISH TIME (SHAPE) | L= L-VALUE | POL. EXP | 1 |
| | | W= W-VALUE | | |
| | | D= H-VALUE | | |

FIG.21

| ITEM | FORMULA | CONDITIONS | CLASS | SETUP |
|---|---|---|---|---|
| S.C. MATL | S.C.MATL | S.C. WIDTH = W-VALUE | MATL EXP | — |
| | | S.C. LENGTH = L-VALUE | | |
| | | S.C. HEIGHT = H-VALUE | | |
| S.C. STD PARTS | S.C.MATL | S.C. WIDTH = W-VALUE | MATL EXP | — |
| | | S.C. LENGTH = L-VALUE | | |
| | | S.C. HEIGHT = H-VALUE | | |
| S.C. NITRID. | S.C. NITRID. | S.C. WIDTH = W-VALUE | PROC. EXP | — |
| | | S.C. LENGTH = L-VALUE | | |
| | | S.C. HEIGHT = H-VALUE | | |
| S.C. STR MC | S.C. MC | S.C. WIDTH = W-VALUE | MC EXP | — |
| | | S.C. LENGTH = L-VALUE | | |
| | | S.C. HEIGHT = H-VALUE | | |

FIG.22

| ITEM | FORMULA | CONDITIONS | CLASS | SETUP |
|---|---|---|---|---|
| L.C. MATL | L.C. MATL | L.C. WIDTH = W-VALUE | MATL EXP | |
| | | L.C. LENGTH = L-VALUE | | |
| | | L.C. HEIGHT = H-VALUE | | |
| L.C. STD PARTS | L.C. MATL | L.C. WIDTH = W-VALUE | MATL EXP | — |
| | | L.C. LENGTH = L-VALUE | | |
| | | L.C. HEIGHT = H-VALUE | | |
| L.C. NITRID. | L.C. NITRID. | L.C. WIDTH = W-VALUE | PROC. EXP | — |
| | | L.C. LENGTH = L-VALUE | | |
| | | L.C. HEIGHT = H-VALUE | | |
| L.C. STR MC | L.C. MC | L.C. WIDTH = W-VALUE | MC EXP | — |
| | | L.C. LENGTH = L-VALUE | | |
| | | L.C. HEIGHT = H-VALUE | | |

FIG.23

| MC NAME  DIA THICKNESS | PREPARED HOLE, C. BORE, REAMER |||||||||
|---|---|---|---|---|---|---|---|---|---|
| | ~5 | ~10 | ~20 | ~30 | ~50 | OVER 50 (1ST) | OVER 50 (2ND) | OVER 50 (REAMER) |
| 5mm | : : | : : | : : | : : | : : | : : | : : | : : |
| 10mm | : : | : : | : : | : : | : : | : : | : : | : : |
| 15mm | : : | : : | : : | : : | : : | : : | : : | : : |
| 20mm | : : | : : | : : | : : | : : | : : | : : | : : |
| 25mm | : : | : : | : : | : : | : : | : : | : : | : : |
| 30mm | : : | : : | : : | : : | : : | : : | : : | : : |
| 35mm | : : | : : | : : | : : | : : | : : | : : | : : |
| 40mm | : : | : : | : : | : : | : : | : : | : : | : : |
| 45mm | : : | : : | : : | : : | : : | : : | : : | : : |
| 50mm | : : | : : | : : | : : | : : | : : | : : | : : |
| 55mm | : : | : : | : : | : : | : : | : : | : : | : : |
| 60mm | : : | : : | : : | : : | : : | : : | : : | : : |
| 80mm | : : | : : | : : | : : | : : | : : | : : | : : |
| 100mm | : : | : : | : : | : : | : : | : : | : : | : : |
| 120mm | : : | : : | : : | : : | : : | : : | : : | : : |
| 150mm | : : | : : | : : | : : | : : | : : | : : | : : |
| 220mm | : : | : : | : : | : : | | | : : | : : |
| 310mm | : : | : : | : : | : : | | | | |
| 380mm | | | | | | : : | | |

FIG.24A

| WIDTH | CUTTING TOLL DIA | UNIT AMOUNT |
|---|---|---|
| W < 50 | ... | ... |
| 50 < W < 100 | ... | ... |
| 100 < W < 300 | ... | ... |
| 300 < W < 600 | ... | ... |
| 600 < W | ... | ... |

FIG.24B

| COPPER | PRE-HARDENED STEEL |
|---|---|
| 0.50 | 1.00 |

FIG.25A

| RIB WIDTH | AMOUNT OF CUTTING | CUTTING SPEED |
|---|---|---|
| 0 < W < 1.0 | ... | ... |
| 1.0 < W < 1.2 | ... | ... |
| 1.2 < W < 1.5 | ... | ... |
| 1.5 < W < 2.0 | ... | ... |
| 2.0 < W < 2.5 | ... | ... |

FIG.25B

| WIDTH | CORRECTION FACTOR |
|---|---|
| W < 4 | ... |
| 4 < W < 10 | ... |
| 10 < W | ... |

FIG.25C

| DEPTH | DEPTH FACTOR |
|---|---|
| D < 5 | ... |
| 5 < D < 25 | ... |
| 15 < D < 25 | ... |
| 25 < D | ... |

FIG.26

| CLASS<br>NAME<br>THICKNESS | FIN. | ROUGH ($\alpha$)<br>n = 0 | FINISH ($\beta$)<br>n = 1 | ROUGH<br>R + F.<br>(1 TIME)<br>n = 1 | FINE<br>R + F.<br>(2 TIMES)<br>n = 2 | VERY FINE<br>R + F.<br>(3 TIMES)<br>n = 3 |
|---|---|---|---|---|---|---|
| 5mm | | | | | | |
| 10mm | | | | | | |
| 15mm | | | | | | |
| 20mm | | | | | | |
| 25mm | | | | | | |
| 30mm | | | | | | |
| 35mm | | | | | | |
| 40mm | | | | | | |
| 45mm | | | | | | |
| 50mm | | | | | | |
| 55mm | | | | | | |
| 60mm | | | | | | |
| 80mm | | | | | | |
| 100mm | | | | | | |
| 120mm | | | | | | |
| 150mm | | | | | | |

FIG.27

| SLIDE SIZE | | | MC | | SG | | MG | | RB | | HAND-TAP | | TOTAL | |
|---|---|---|---|---|---|---|---|---|---|---|---|---|---|---|
| W | H | L | SET. | MC | SET. | MC | SET. | MC | SET. | MC | SET. | MC | SET. | MC |
| 50 | 25 | 38 | ... | ... | ... | ... | ... | ... | ... | ... | ... | ... | ... | ... |
| 50 | 50 | 75 | ... | ... | ... | ... | ... | ... | ... | ... | ... | ... | ... | ... |
| 100 | 50 | 75 | ... | ... | ... | ... | ... | ... | ... | ... | ... | ... | ... | ... |
| 100 | 100 | 150 | ... | ... | ... | ... | ... | ... | ... | ... | ... | ... | ... | ... |
| 200 | 100 | 150 | ... | ... | ... | ... | ... | ... | ... | ... | ... | ... | ... | ... |
| 200 | 200 | 300 | ... | ... | ... | ... | ... | ... | ... | ... | ... | ... | ... | ... |
| 300 | 100 | 150 | ... | ... | ... | ... | ... | ... | ... | ... | ... | ... | ... | ... |
| 300 | 200 | 300 | ... | ... | ... | ... | ... | ... | ... | ... | ... | ... | ... | ... |
| 400 | 100 | 150 | ... | ... | ... | ... | ... | ... | ... | ... | ... | ... | ... | ... |
| 400 | 200 | 300 | ... | ... | ... | ... | ... | ... | ... | ... | ... | ... | ... | ... |
| 500 | 100 | 150 | ... | ... | ... | ... | ... | ... | ... | ... | ... | ... | ... | ... |
| 500 | 200 | 300 | ... | ... | ... | ... | ... | ... | ... | ... | ... | ... | ... | ... |

FIG.28

| LOOSE CORE | | MC | | MIL. | | SG | | MG | | WC | | TOTAL | |
|---|---|---|---|---|---|---|---|---|---|---|---|---|---|
| W | L | SET. | MC | SET. | MC | SET. | MC | SET. | MC | SET. | MC | SET. | MC |
| 10 | 30 | ⋮ | ⋮ | ⋮ | ⋮ | ⋮ | ⋮ | ⋮ | ⋮ | ⋮ | ⋮ | ⋮ | ⋮ |
| 30 | 40 | ⋮ | ⋮ | ⋮ | ⋮ | ⋮ | ⋮ | ⋮ | ⋮ | ⋮ | ⋮ | ⋮ | ⋮ |
| 50 | 50 | ⋮ | ⋮ | ⋮ | ⋮ | ⋮ | ⋮ | ⋮ | ⋮ | ⋮ | ⋮ | ⋮ | ⋮ |
| 75 | 50 | ⋮ | ⋮ | ⋮ | ⋮ | ⋮ | ⋮ | ⋮ | ⋮ | ⋮ | ⋮ | ⋮ | ⋮ |
| 100 | 60 | ⋮ | ⋮ | ⋮ | ⋮ | ⋮ | ⋮ | ⋮ | ⋮ | ⋮ | ⋮ | ⋮ | ⋮ |
| 150 | 70 | ⋮ | ⋮ | ⋮ | ⋮ | ⋮ | ⋮ | ⋮ | ⋮ | ⋮ | ⋮ | ⋮ | ⋮ |
| 200 | 80 | ⋮ | ⋮ | ⋮ | ⋮ | ⋮ | ⋮ | ⋮ | ⋮ | ⋮ | ⋮ | ⋮ | ⋮ |
| 300 | 90 | ⋮ | ⋮ | ⋮ | ⋮ | ⋮ | ⋮ | ⋮ | ⋮ | ⋮ | ⋮ | ⋮ | ⋮ |
| 400 | 100 | ⋮ | ⋮ | ⋮ | ⋮ | ⋮ | ⋮ | ⋮ | ⋮ | ⋮ | ⋮ | ⋮ | ⋮ |

FIG.29

| C/C | TIME FACTOR | NO. OF UNITS |
|---|---|---|
| 1) WIRE-CUT (ED) | | |
| SETUP | ... | |
| MACHINE TIME | ... | 2 |
| 2) MACHINING CENTER | | |
| SETUP | ... | |
| MACHINE TIME | ... | 3 |
| 3) MILLING | | |
| SETUP | ... | |
| MACHINE TIME | ... | 1 |
| 4) RADIAL DRILLING MACHINE | | |
| SETUP | ... | |
| MACHINE TIME | ... | 1 |
| 5) SURFACE GRINDING MACHINE | | |
| SETUP | ... | |
| MACHINE TIME | ... | 2 |
| 6) MOLDING GRINDING MACHINE | | |
| SETUP | ... | |
| MACHINE TIME | ... | 1 |
| 7) LATHE TURNING MACHINE | | |
| SETUP | ... | |
| MACHINE TIME | ... | 1 |
| 8) HAND TAP | | |
| SETUP | ... | |
| MACHINE TIME | ... | 1 |
| 9) NC MILLING MACHINE | | |
| SETUP | ... | |
| MACHINE TIME | ... | 3 |
| 10) ED | | |
| SETUP | ... | |
| MACHINE TIME | ... | 2 |

FIG.30

| C/C NAME | C/C CAPACITY | FACILITY & SHARED EXP. RATIO (YEN/HOUR) | LABOR & SHARED EXP. RATIO (YEN/HOUR) | TOTAL (YEN/HOUR) | FACILITY & SHARED EXP. RATIO (YEN/SECOND) | LABOR & SHARED EXP. RATIO (YEN/SECOND) | TOTAL (YEN/SECOND) |
|---|---|---|---|---|---|---|---|
| M.C. | SMALL | ... | ... | ... | ... | ... | ... |
| M.C. | MEDIUM | ... | ... | ... | ... | ... | ... |
| M.C. | LARGE | ... | ... | ... | ... | ... | ... |
| W.E.D.M | SMALL | ... | ... | ... | ... | ... | ... |
| W.E.D.M | LARGE | ... | ... | ... | ... | ... | ... |
| E.D.M. | SMALL | ... | ... | ... | ... | ... | ... |
| E.D.M. | LARGE | ... | ... | ... | ... | ... | ... |
| N.C.M. | SMALL | ... | ... | ... | ... | ... | ... |
| N.C.M. | MEDIUM | ... | ... | ... | ... | ... | ... |
| MIL | SMALL | ... | ... | ... | ... | ... | ... |
| MIL | LARGE | ... | ... | ... | ... | ... | ... |
| S.G.M. | SMALL | ... | ... | ... | ... | ... | ... |
| S.G.M. | LARGE | ... | ... | ... | ... | ... | ... |
| M G M | — | ... | ... | ... | ... | ... | ... |
| R.D.M. | — | ... | ... | ... | ... | ... | ... |
| S.D.M. | — | ... | ... | ... | ... | ... | ... |
| HAND TAP | — | ... | ... | ... | ... | ... | ... |
| POLISH | — | ... | ... | ... | ... | ... | ... |
| ASSEMBLY | DIE SPOT + INVERT | ... | ... | ... | ... | ... | ... |
| ASSEMBLY | (HAND) | ... | ... | ... | ... | ... | ... |
| CCD/CAM/CAE | — | ... | ... | ... | ... | ... | ... |
| CNC L.T.M. | CORE DISTANCE 700mm | ... | ... | ... | ... | ... | ... |
| MEASURE | — | ... | ... | ... | ... | ... | ... |

FIG.31

| No. | MOLD SIZE (mm) L x W x H | CORE SIZE (mm) L x W x H | FACILITY NAME | | | | | |
|---|---|---|---|---|---|---|---|---|
| | | | M.C. | N.C.M. | W.E.D.M. | E.D.M. | M.M. | S.G.M. |
| 1 | 112 × 90 × 15 | 112 × 100 × 12 | | | | | | |
| 2 | 176 × 110 × 18 | 186 × 120 × 23 | | | | | | |
| 3 | 215 × 150 × 18 | 225 × 160 × 14 | | | | | | |
| 4 | 215 × 150 × 35 | 225 × 160 × 27 | | | | | | |
| 5 | 215 × 150 × 60 | 225 × 160 × 45 | | | | | | |
| 6 | 250 × 180 × 23 | 260 × 190 × 18 | | | | | | |
| 7 | 250 × 180 × 45 | 260 × 190 × 34 | | | | | | |
| 8 | 345 × 220 × 33 | 355 × 230 × 25 | | | SMALL | | SMALL | |
| 9 | 345 × 220 × 65 | 335 × 230 × 49 | | SMALL | | SMALL | | |
| 10 | 385 × 260 × 65 | 400 × 275 × 34 | SMALL | | | | | |
| 11 | 385 × 260 × 90 | 400 × 275 × 68 | | | | | | |
| 12 | 464 × 290 × 60 | 479 × 305 × 45 | | | | | | |
| 13 | 464 × 290 × 90 | 479 × 305 × 67.5 | | | | | | SMALL |
| 14 | 464 × 290 × 120 | 479 × 305 × 90 | | | | | | |
| 15 | 620 × 350 × 65 | 640 × 370 × 49 | | | | | | |
| 16 | 620 × 350 × 97.5 | 640 × 370 × 73.5 | | | | | | |
| 17 | 620 × 350 × 130 | 640 × 370 × 98 | | | | | | |
| 18 | 770 × 430 × 75 | 790 × 450 × 57 | | | | | | |
| 19 | 770 × 430 × 112.5 | 790 × 450 × 85 | | | | | | |
| 20 | 770 × 430 × 150 | 790 × 450 × 113 | | | | | | |
| 21 | 860 × 510 × 85 | 880 × 530 × 64 | | | | | | |
| 22 | 860 × 510 × 127.5 | 880 × 530 × 96 | | | | | | |
| 23 | 860 × 510 × 170 | 880 × 530 × 128 | MEDIUM | | | | | |
| 24 | 960 × 570 × 170 | 980 × 590 × 68 | | | | | | |
| 25 | 960 × 570 × 135 | 980 × 590 × 101.5 | | | LARGE | | LARGE | |
| 26 | 960 × 570 × 180 | 980 × 590 × 135 | | | | LARGE | | |
| 27 | 1160 × 640 × 100 | 1180 × 660 × 75 | | | | | | |
| 28 | 1160 × 640 × 150 | 1180 × 660 × 112.5 | | | | | | |
| 29 | 1160 × 640 × 200 | 1180 × 660 × 150 | | MEDIUM | | | | |
| 30 | 1320 × 810 × 125 | 1350 × 830 × 94 | | | | | | LARGE |
| 31 | 1320 × 810 × 125 | 1350 × 830 × 141 | LARGE | | | | | |
| 32 | 1320 × 810 × 250 | 1350 × 830 × 188 | | | | | | |
| 33 | 1530 × 1040 × 150 | 1560 × 1070 × 113 | | | | | | |
| 34 | 1530 × 1040 × 225 | 1560 × 1070 × 169 | | | | | | |
| 35 | 1530 × 1040 × 300 | 1560 × 1070 × 225 | | | | | | |

FIG.32

| SLIDE CORE SIZE (W×H×L) | SLIDE CORE MATL SIZE (W×H×L) | STEEL MATL PRICE | P.S.P. PRICE | SUM |
|---|---|---|---|---|
| 50×25×38 | 26×25×38 | ... | ... | ... |
| 50×50×75 | 56×50×75 | ... | ... | ... |
| 100×50×75 | 106×50×75 | ... | ... | ... |
| 100×100×150 | 108×100×150 | ... | ... | ... |
| 200×100×150 | 208×100×150 | ... | ... | ... |
| ... | ... | ... | ... | ... |
| ... | ... | ... | ... | ... |

FIG.33

| LOOSE CORE SIZE | | LOOSE CORE MATL SIZE | | STEEL MATL PRICE (YEN) | P.S.P. PRICE (YEN) | SUM (YEN) |
|---|---|---|---|---|---|---|
| WIDTH | LENGTH | W x T | HEIGHT | | | |
| 10 | 30 | 10 × 60 | 200 | ... | ... | ... |
| | | | 400 | ... | ... | ... |
| | | | 600 | ... | ... | ... |
| | | | 810 | ... | ... | ... |
| 30 | 40 | 30 × 80 | 200 | ... | ... | ... |
| | | | 400 | ... | ... | ... |
| | | | 600 | ... | ... | ... |
| | | | 810 | ... | ... | ... |
| 50 | 50 | 50 × 100 | 200 | ... | ... | ... |
| | | | 400 | ... | ... | ... |
| | | | 600 | ... | ... | ... |
| | | | 810 | ... | ... | ... |
| 75 | 50 | 75 × 100 | 200 | ... | ... | ... |
| | | | 400 | ... | ... | ... |
| | | | 600 | ... | ... | ... |
| | | | 810 | ... | ... | ... |
| ... | ... | ... | ... | ... | ... | ... |
| | | | ... | ... | ... | ... |
| | | | ... | ... | ... | ... |
| | | | ... | ... | ... | ... |
| ... | ... | ... | ... | ... | ... | ... |
| | | | ... | ... | ... | ... |
| | | | ... | ... | ... | ... |
| | | | ... | ... | ... | ... |

FIG.34

| MOLD SIZE (mm) | | | LOOSE CORE HEIGHT | LOOSE CORE MATL HEIGHT |
|---|---|---|---|---|
| L | W | H | (mm) | (mm) |
| 112 | 90 | 15 | 106 | ... |
| 176 | 110 | 30 | 141 | ... |
| 215 | 150 | 18 | 125 | ... |
| | | 35 | 150 | ... |
| | | 60 | 230 | ... |
| 250 | 180 | 23 | 140 | ... |
| | | 45 | 200 | ... |
| 345 | 220 | 33 | 160 | ... |
| | | 65 | ... | ... |
| 385 | 260 | 45 | ... | ... |
| | | 90 | ... | ... |
| 464 | 290 | 60 | ... | ... |
| | | 90 | ... | ... |
| | | 120 | ... | ... |
| ... | ... | ... | ... | ... |
| | | ... | ... | ... |
| ... | ... | ... | ... | ... |
| | | ... | ... | ... |
| | | ... | ... | ... |
| ... | ... | ... | ... | ... |
| | | ... | ... | ... |
| ... | ... | ... | ... | ... |
| | | ... | ... | ... |

FIG.36

| SLIDE CORE SIZE (W x H x L) | SLIDE CORE MATL SIZE (W x H x L) | NITRIDING PRICE |
|---|---|---|
| 50 x 25 x 38 | 26 x 25 x 38 | ⋮ |
| 50 x 50 x 75 | 56 x 50 x 75 | ⋮ |
| 100 x 50 x 75 | 106 x 50 x 75 | ⋮ |
| 100 x 100 x 150 | 108 x 100 x 150 | ⋮ |
| 200 x 100 x 150 | 208 x 100 x 150 | ⋮ |
| ⋮ | ⋮ | ⋮ |
| ⋮ | ⋮ | ⋮ |

FIG.37

| LOOSE CORE SIZE | | LOOSE CORE MATL SIZE | | NITRIDING PRICE |
|---|---|---|---|---|
| WIDTH | LENGTH | W x T | HEIGHT | |
| 10 | 30 | 10 × 60 | 200 | ... |
| | | | 400 | ... |
| | | | 600 | ... |
| | | | 810 | ... |
| 30 | 40 | 30 × 80 | 200 | ... |
| | | | 400 | ... |
| | | | 600 | ... |
| | | | 810 | ... |
| 50 | 50 | 50 × 100 | 200 | ... |
| | | | 400 | ... |
| | | | 600 | ... |
| | | | 810 | ... |
| 75 | 50 | 75 × 100 | 200 | ... |
| | | | 400 | ... |
| | | | 600 | ... |
| | | | 810 | ... |
| ... | ... | ... | ... | ... |
| | | | ... | ... |
| | | | ... | ... |
| | | | ... | ... |
| ... | ... | ... | ... | ... |
| | | | ... | ... |
| | | | ... | ... |
| | | | ... | ... |

FIG.38

| PROJECTION AREA (mm²) | | | CAPACITY (ton) | WIDTH (mm) | LENGTH (mm) | DEPTH (mm) | |
|---|---|---|---|---|---|---|---|
| PC, PC + GLASS INNER WEIGHTING 450Kg/cm² | PPE, PC ALLOY, GLASS INNER THICKNESS 400Kg/cm² | OTHER INNER THICKNESS 350Kg/cm² | | | | 2-PLATE | 3-PLATE |
| ⋮ | ⋮ | ⋮ | 1600 | ⋮ | ⋮ | ⋮ | ⋮ |
| ⋮ | ⋮ | ⋮ | 1300 | 850 | 1620 | ⋮ | ⋮ |
| ⋮ | ⋮ | ⋮ | 850 | ⋮ | ⋮ | 385 | 355 |
| ⋮ | ⋮ | ⋮ | 650 | ⋮ | ⋮ | ⋮ | ⋮ |
| 122000 | 137500 | 157000 | 550 | ⋮ | ⋮ | ⋮ | ⋮ |
| ⋮ | ⋮ | ⋮ | 450 | ⋮ | ⋮ | ⋮ | ⋮ |
| ⋮ | ⋮ | ⋮ | 350 | ⋮ | ⋮ | ⋮ | ⋮ |
| ⋮ | ⋮ | ⋮ | 280 | ⋮ | ⋮ | ⋮ | ⋮ |
| ⋮ | ⋮ | ⋮ | 220 | ⋮ | ⋮ | ⋮ | ⋮ |
| ⋮ | ⋮ | ⋮ | 170 | ⋮ | ⋮ | ⋮ | ⋮ |
| ⋮ | ⋮ | ⋮ | 100 | ⋮ | ⋮ | ⋮ | ⋮ |
| ⋮ | ⋮ | ⋮ | 80 | ⋮ | ⋮ | ⋮ | ⋮ |
| ⋮ | ⋮ | ⋮ | 55 | ⋮ | ⋮ | ⋮ | ⋮ |
| ⋮ | ⋮ | ⋮ | 30 | ⋮ | ⋮ | ⋮ | ⋮ |
| ⋮ | ⋮ | ⋮ | 18 | ⋮ | ⋮ | ⋮ | ⋮ |

FIG.39

| CAPACITY | BASIC TIME | TIME PER LOCATION | | |
|---|---|---|---|---|
| | | SLIDE | CAVITY | CORE |
| 18t | ... | ... | ... | ... |
| 30t | ... | ... | ... | ... |
| 55t | ... | ... | ... | ... |
| 80t | ... | ... | ... | ... |
| 100t | ... | ... | ... | ... |
| 170t | ... | ... | ... | ... |
| 220t | ... | ... | ... | ... |
| 280t | ... | ... | ... | ... |
| 350t | ... | ... | ... | ... |
| 450t | ... | ... | ... | ... |
| 550t | ... | ... | ... | ... |
| 650t | ... | ... | ... | ... |
| 850t | ... | ... | ... | ... |
| 1300t | ... | ... | ... | ... |
| 1600t | ... | ... | ... | ... |

FIG.40A

| MOLD CAPACITY | SETUP TIME |
|---|---|
| ~170t | ... |
| ~350t | ... |
| ~1600t | ... |

FIG.40B

| CLASSIFICATION | SETUP TIME |
|---|---|
| NEED OF SUPPORT | ... |
| OTHER | ... |

FIG.41

| C/C NAME | C/C CAPACITY | FACILITY & SHARED EXP. RATIO (YEN/HOUR) | LABOR & SHARED EXP. RATIO (YEN/HOUR) | TOTAL (YEN/HOUR) | FACILITY & SHARED EXP. RATIO (YEN/SECOND) | LABOR & SHARED EXP. RATIO (YEN/SECOND) | TOTAL (YEN/SECOND) |
|---|---|---|---|---|---|---|---|
| MOLD. M. | 18t | ⋮ | ⋮ | ⋮ | ⋮ | ⋮ | ⋮ |
| MOLD. M. | 30t | ⋮ | ⋮ | ⋮ | ⋮ | ⋮ | ⋮ |
| MOLD. M. | 55t | ⋮ | ⋮ | ⋮ | ⋮ | ⋮ | ⋮ |
| MOLD. M. | 80t | ⋮ | ⋮ | ⋮ | ⋮ | ⋮ | ⋮ |
| MOLD. M. | 100t | ⋮ | ⋮ | ⋮ | ⋮ | ⋮ | ⋮ |
| MOLD. M. | 170t | ⋮ | ⋮ | ⋮ | ⋮ | ⋮ | ⋮ |
| MOLD. M. | 220t | ⋮ | ⋮ | ⋮ | ⋮ | ⋮ | ⋮ |
| MOLD. M. | 280t | ⋮ | ⋮ | ⋮ | ⋮ | ⋮ | ⋮ |
| MOLD. M. | 350t | ⋮ | ⋮ | ⋮ | ⋮ | ⋮ | ⋮ |
| MOLD. M. | 450t | ⋮ | ⋮ | ⋮ | ⋮ | ⋮ | ⋮ |
| MOLD. M. | 550t | ⋮ | ⋮ | ⋮ | ⋮ | ⋮ | ⋮ |
| MOLD. M. | 650t | ⋮ | ⋮ | ⋮ | ⋮ | ⋮ | ⋮ |
| MOLD. M. | 850t | ⋮ | ⋮ | ⋮ | ⋮ | ⋮ | ⋮ |
| MOLD. M. | 1300t | | | | | | |
| MOLD. M. | 1600t | | | | | | |

FIG.42A

| MOLD CAPACITY | UNIT TRY TIME | UNIT TRY MAN-HOUR |
|---|---|---|
| ~100t | ... | ... |
| ~280t | ... | ... |
| ~650t | ... | ... |
| ~1600t | ... | ... |

FIG.42B

| CONDITIONS | NO. OF TRIES |
|---|---|
| GEOMETRIC TOL. | ... |
| APPEARANCE | ... |
| TOLERANCE | ... |
| 0TH, 1ST CLASS | ... |
| NEED OF SUPPORT | ... |
| OTHER | ... |

FIG.43

| FACILITY (ton) | 18 | 30 | 55 | 80 | 100 | 170 | 220 | 280 |
|---|---|---|---|---|---|---|---|---|
| WEIGHT (g) | ... | ... | ... | ... | ... | ... | ... | ... |
| FACILITY (ton) | 350 | 450 | 550 | 650 | 850 | 1,300 | 1,600 | |
| WEIGHT (g) | ... | ... | ... | ... | ... | ... | ... | |

DIE MODIFICATION ESTIMATE SYSTEM AND PROGRAM

BACKGROUND OF THE INVENTION

1. Field of the Invention

The present invention relates to a die modification estimate system and a die modification estimate program.

2. Description of the Related Art

Conventionally, a system which receives the inputs of the manufacture conditions of an injection molding die from the user who wants an estimate cost is known. The system outputs a manufacturing cost of the die according to the inputs of the user.

However, a design change of the injection molding die after the shipment thereof is often performed based on the request of the user of the die. The modification of the die is performed according to the design change by taking much time and labor, and the shipment of the modified die to the user is performed again.

Therefore, it is desired to realize an estimate system which is able to receive specification of the contents of the modification of the injection molding die and quickly output a reliable modification cost according to the specified contents of the die modification.

SUMMARY OF THE INVENTION

An object of the present invention is to provide a novel and useful die modification estimate system in which the above-described problems are eliminated.

Another object of the present invention is to provide a die modification estimate system that quickly outputs a reliable modification cost according to the contents of die modification specified by the person who wants an estimate cost.

Another object of the present invention is to provide a die modification estimate program that quickly outputs a reliable modification cost according to the contents of die modification specified by the person who wants an estimate cost.

The above-mentioned objects of the present invention are achieved by a die modification estimate system including an input unit, an output unit and a storage unit, which comprises: a first unit acquiring contents of modification of a die specified by using the input unit; a second unit reading respective reference values for cost estimation according to the specified contents of the die modification, from the storage unit; a third unit reading respective estimate functions of cost items according to the specified contents of the die modification, from the storage unit; a fourth unit calculating an estimated cost of each of the cost items based on a corresponding one of the reference values and a corresponding one of the estimate functions respectively; a fifth unit storing the estimated costs calculated by the fourth unit, in the storage unit; a sixth unit calculating a total amount of the estimated costs read from the storage unit; and a seventh unit outputting the total amount of the estimated costs to the output unit.

The above-mentioned objects of the present invention are achieved by a computer program which is embodied therein for causing a processing unit of a die modification estimate system to execute a die modification estimate process, the die modification estimate system including an input unit, an output unit and a storage unit, the process comprising steps of: acquiring contents of modification of a die specified by using the input unit; reading respective reference values for cost estimation according to the specified contents of the die modification, from the storage unit; reading respective estimate functions of cost items according to the specified contents of the die modification, from the storage unit; calculating an estimated cost of each of the cost items based on a corresponding one of the reference values and a corresponding one of the estimate functions respectively; storing the estimated costs calculated in the calculating step, in the storage unit; calculating a total amount of the estimated costs read from the storage unit; and outputting the total amount of the estimated costs to the output unit.

According to the present invention, the die modification estimate system and program can quickly output a reliable modification cost according to the contents of die modification specified by the person who wants an estimate cost. Moreover, the person who wants an estimate cost can grasp the required time for operation of the die machining facility corresponding to the specified contents of the modification.

BRIEF DESCRIPTION OF THE DRAWINGS

Other objects, features and advantages of the present invention will be apparent from the following detailed description when read in conjunction with the accompanying drawings.

FIG. 3 is a diagram showing the main screen of the die modification estimate system of FIG. 1.

FIG. 4 is a diagram showing the material information screen.

FIG. 5 is a diagram showing the process information screen.

FIG. 6 is a diagram showing the die cost information screen.

FIG. 7 is a diagram showing the CAD information confirmation screen.

FIG. 9 is a diagram showing the die modification cost calculation list screen.

FIG. 10 is a flowchart for explaining the machining cost calculation performed by the die modification estimate system of FIG. 1.

FIG. 11 is a diagram showing the machining pattern-table used by the die modification estimate system of FIG. 1.

FIG. 12 is a diagram showing the new insert machining calculation condition table.

FIG. 13 is a diagram showing the rib shape machining calculation condition table.

FIG. 14 is a diagram showing the boss shape machining calculation condition table.

FIG. 15 is a diagram showing the round-hole shape machining calculation condition table.

FIG. 16 is a diagram showing the louver shape machining calculation condition table.

FIG. 17 is a diagram showing the material list calculation condition table.

FIG. 18 is a diagram showing the MC and EDM shape machining calculation condition table.

FIG. 19 is a diagram showing the MC three-dimensional shape machining calculation condition table.

FIG. 20 is a diagram showing the EDM shape machining calculation condition table.

FIG. 21 is a diagram showing the new-slide core table.

FIG. 22 is a diagram showing the new loose core machining calculation condition table.

FIG. 23 is a diagram showing the MC drilling time coefficient table.

FIG. 24A and FIG. 24B are diagrams showing the MC counter sinking unit amount table and the material coefficient table.

FIG. 25A, FIG. 25B and FIG. 25C are diagrams showing the MC rib table, the electric discharge machining table and the polishing machining table respectively.

FIG. 26 is a diagram showing the WC machining time coefficient table.

FIG. 27 is a diagram showing the slide-core size setup/machining time table.

FIG. 28 is a diagram showing the loose-core size setup/machining time table.

FIG. 29 is a diagram showing the time coefficient table.

FIG. 30 is a diagram showing the C/C machining ratio table.

FIG. 31 is a diagram showing the facility capacity selection table.

FIG. 32 is a diagram showing the slide-core material expense table.

FIG. 33 is a diagram showing the loose-core material expense table.

FIG. 34 is a diagram showing the loose-core height table.

FIG. 36 is a diagram showing the slide-core nitriding expense table.

FIG. 37 is a diagram showing the loose-core nitriding expense table.

FIG. 38 is a diagram showing the molding machine weight selection table.

FIG. 39 is a diagram showing the break-up time table.

FIG. 40A and FIG. 40B are diagrams showing the measurement expense related tables.

FIG. 41 is a diagram showing the injection molding machine expense ratio table.

FIG. 42A and FIG. 42B are diagrams showing the try expense related tables.

FIG. 43 is a diagram showing the material change weight table.

DETAILED DESCRIPTION OF PREFERRED EMBODIMENTS

A description will now be provided of the preferred embodiments of the present invention with reference to the accompanying drawings.

Figure 1:
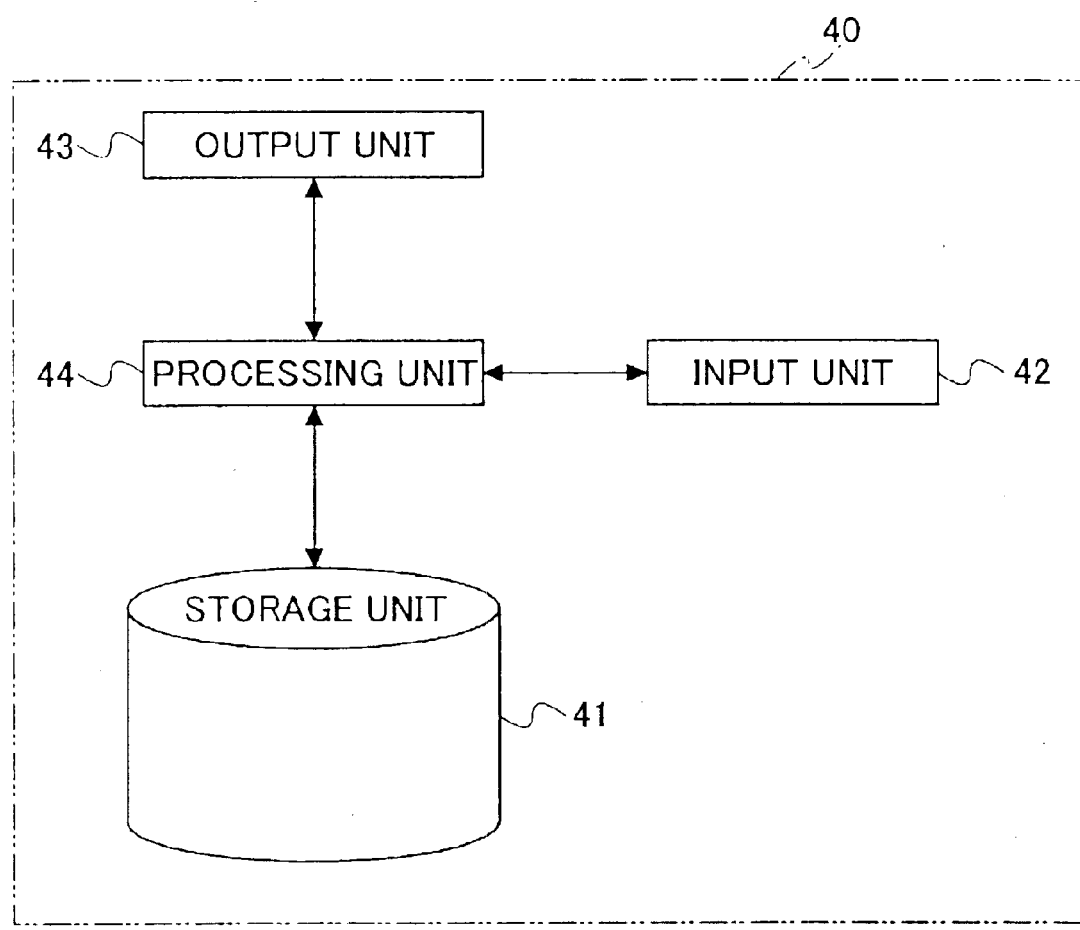
FIG. 1 is a block diagram of the die modification estimate system of one preferred embodiment of the present invention.

FIG. 1 shows the composition of a die modification estimate system of one preferred-embodiment of the present invention.

As shown in FIG. 1, the die modification estimate system 40 of the present embodiment comprises a storage unit 41, an input unit 42, an output unit 43, and a processing unit 44.

The storage unit 41 physically includes a main memory and a hard disk. It is not necessary that the storage unit 41 is a single composition.

The hard disk of the storage unit 41 stores the estimate program for causing the processing unit 44 to perform estimate processing. The estimate program is suitably loaded from the hard disk to the main memory, and performed by the processing unit 44.

Moreover, the hard disk of the storage unit 41 stores correlation with the predetermined calculation reference value according to the contents of die modification and the contents of the modification.

The "contents of die modification" is the attribute of the die used as the object of concern, and it is inputted from the person who wants an estimate cost through the below-mentioned contents input screen of the modification.

The detail of the contents input screen of the modification is explained later.

Moreover, the calculation reference value is a parameter which is needed for calculation of the estimated cost, or calculation of the value which is needed in the middle process of estimated cost calculation, and can be acquired from each table stored in the storage unit.

Each table associates the value of the contents of the modification, and the calculation reference value corresponding to this, and there are the calculation condition table classified by machining pattern which associated the calculation reference value corresponding to the contents of the machining and this using each die machining facility for every machining pattern, other various place coefficient tables, etc.

Furthermore, the hard disk of the storage unit 41 stores each estimate function.

The estimate function is the calculation formula for computing the value which is needed in each estimated cost according to the cost items of the die modification, or the middle process of estimated cost calculation.

The cost items of the die modification are classifiable into the material expense, nitriding expense, design/program expense, the machining expense, polishing expense, break-up expense, the assembly and arrangement expense, try expense, measurement expense, the try-material expense, the general management sales expense, material administrative expenses, and the profits expense so that it may explain in full detail behind.

Therefore, in the preferred embodiment, the estimate function for computing the material expense, the disposal cost, design/program expense, the machining expense, polishing expense, breakup expense, the assembly and arrangement expense, try expense, measurement expense, the try-material expense, the general management sales expense, material administrative expenses, and the profits expense is prepared individually.

Here, about the material expense of the cost items, the disposal cost, and the machining expense, the machining pattern according to the contents of the modification specified first is determined, and it differs from calculation of the estimated cost corresponding to other cost items in that the calculation reference value inputted into the estimate function and estimate function which are used for calculation of the estimated cost is determined according to the determined machining pattern.

In order to realize this, the hard disk of the storage unit 41 stores specially the machining pattern table which associated the contents of die modification and the machining pattern which realizes the modification.

The concrete contents of the machining pattern table are explained in full detail by the term of explanation of operation.

The input units 42 are the keyboard, the pointing device, etc.

The output unit 43 is for example, the computer display.

The processing unit 44 may also contain two or more arithmetic units which perform the distributed processing including CPU.

The processing unit 44 expands on the memory the program stored in the hard disk of the storage unit 41, and performs this.

Figure 2:
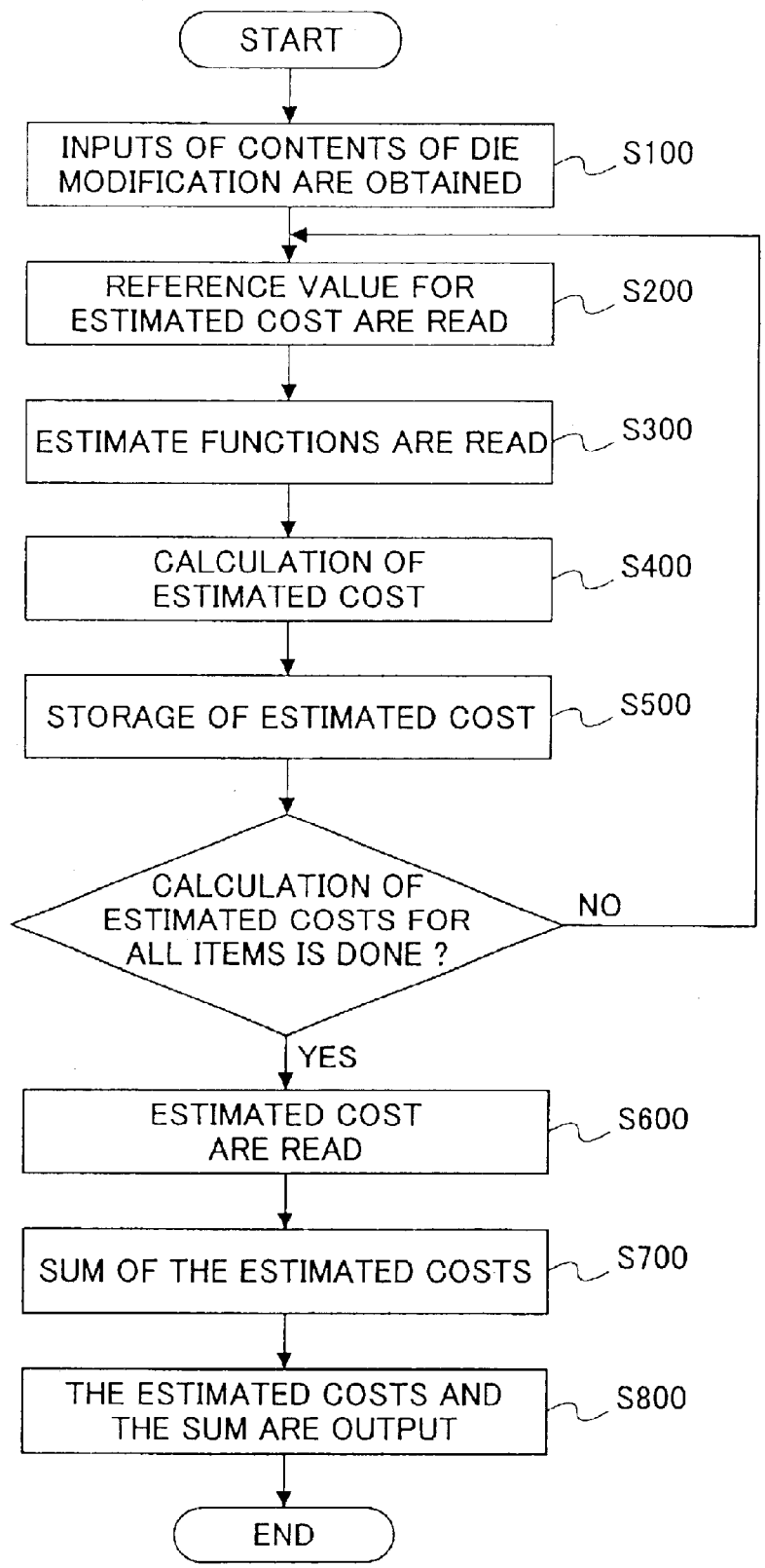
FIG. 2 is a flowchart for explaining operation of the die modification estimate system of FIG. 1.

Here, basic operation of the preferred embodiment is explained, referring to the flowchart of FIG. 2.

First, the processing unit 44 acquires specification of the contents of the modification about the die through the input unit 42 (S100).

As mentioned above, the specification of the contents of the modification is performed through the contents input screen of the modification displayed on the computer screen which is the output unit 43.

There are the three approaches in the input of the contents of the modification through the contents input screen of the modification.

The first is the approach of carrying out direct input of the information required for the estimate of the die from the input item configured on the screen. The second is the approach of calling the part number and the suffix for the data preserved when estimating modification cost of the die which built of-the-same-kind components in the past as a key.

And the third is the approach of calling the default value beforehand prepared for every classification of the molding manufactured with the die.

Figure 3:
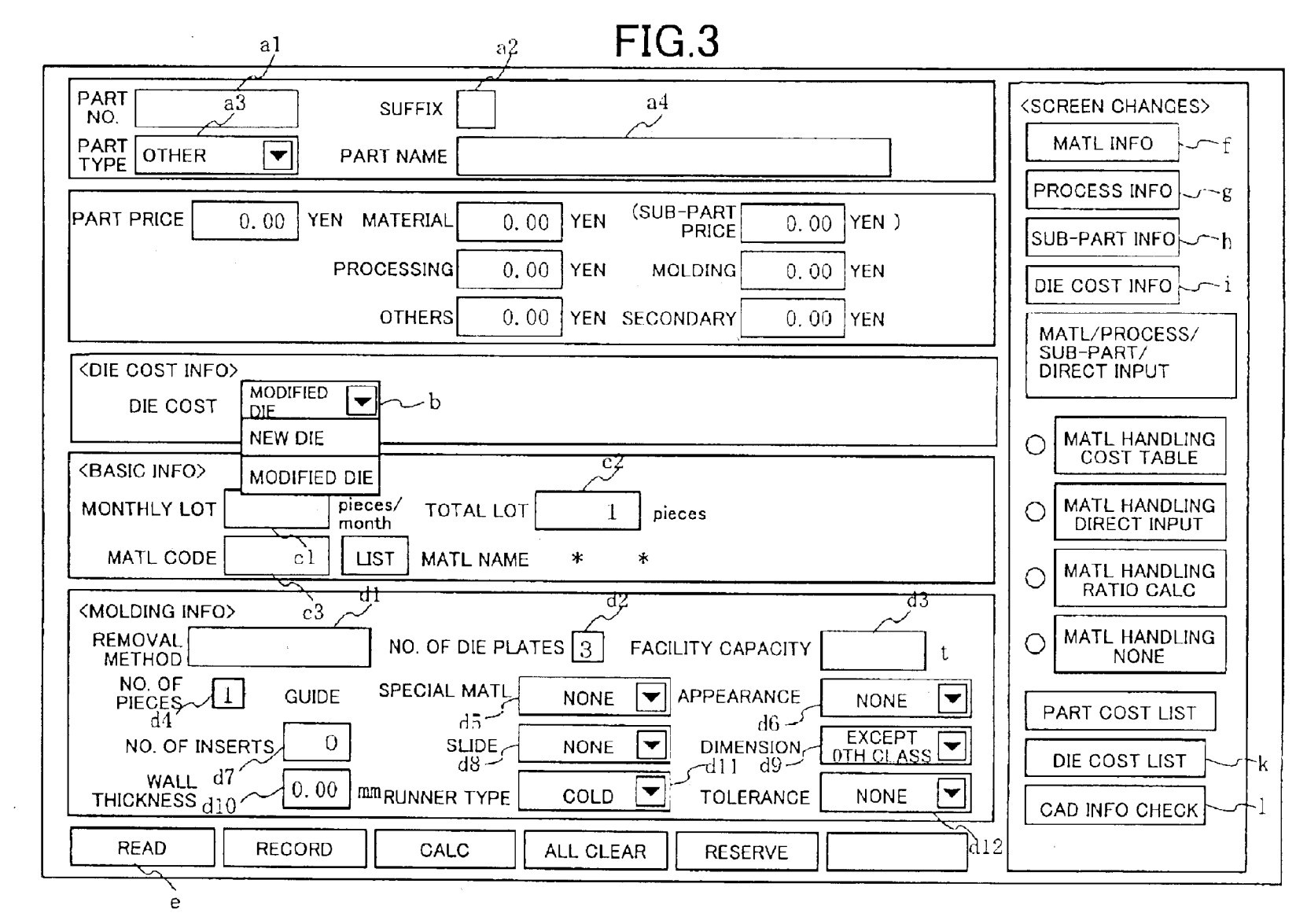

The contents of modification appointed screen—the main screen and material information screen, the process information screen, the sub-part information screen, the die cost information screen, the CAD information confirmation screen, and the image selection screen classified by molding form even when based on which input approach, the main screen shown in FIG. 3 is first displayed on the output unit 43 in the case of specification of the contents of the modification The estimated contents input item b is configured in the middle of the main screen shown in FIG. 3. In the pull-down menu of the estimated contents input item b, either the new die or the modified die is chosen.

When the modified die is chosen by the estimated contents input item b, an estimated modification cost corresponding to the specification of the contents of the modification can be obtained.

On the other hand, when the new die is chosen, the manufacturing cost of the new die can be estimated.

The input items differ between the manufacturing cost of the new die and the modification cost of the modified die.

In the following, a description will be given of only the input items which are required on the occasion of the estimate of modification cost.

The part-number input item a1 of the screen upper row inputs the part number of the molding manufactured by the modified die used as the object of concern.

The suffix input item a2 inputs the suffix of the molding manufactured by the modified die used as the object of concern.

The suffix is information which determines the modification version.

In the preferred embodiment, the version of the contents of the modification can be preserved in the storage unit 41, and it will be read out from the storage unit 41 later.

For example, in the preferred embodiment, the first contents of the modification about the die which manufactures the molding of part-number "B04xxxxxx" are managed by the suffix "A", and the second contents of the modification are managed by the suffix "B."

The form of the molding can be chosen from the pull-down menu of the form input item a3.

There are the electrode holder, the link, the handle, the lever, the pad, the duct, the tray, the side fence, etc. in the form which can be chosen.

If the components name input item a4 inputs the part number and the suffix into the input item, the components name corresponding to this will be displayed.

From the monthly lot input item c1, the volume of the molding per month by the modified die of the object of concern is inputted.

The total number of the lots of the molding is inputted from the total lot input item c2.

The material code-input column c3 inputs the material code of the molding.

The material code chooses the list button on the right-hand side of the input item, displays the material chart, and can be inputted also by choosing the desired material code out of this.

The material chart can acquire various material codes until it is interlocked with the predetermined database of the external terminal, and the material codes include the codes of general-purpose materials, such as ABS, PS, and PE, and the code of engineering plastics materials, such as PC, POM, PA, and PPE.

Although the approach of taking out the extraction approach display item d1 from the die of the molding is displayed, since it is not the factor which affects the estimated cost of the cost of the die modification, when the die modification is chosen by the estimated contents input item b, none of the approach of taking out is displayed.

The die plate input item d2 chooses the number of the plates of the modified die used as the object of concern from either the two plates or the three plates.

The facility capacity display item d3 is not displayed when the modified die is chosen by the estimated contents input item b.

The set-number input item d4 inputs the number of the molding manufactured to per shot by the modified die used as the object of concern.

The special quality-of-the-material input item d5, the appearance grade input item d6, the number input item d7 of building insert, the slide input item d8, the dimension grade input item d9, the average-wall-thickness input item d10, the runner kind input item d11, and the geometric tolerance specification input item d12 are needed in the case of the estimate of the manufacturing cost, and when the modified die is chosen by the estimated contents input item b, the input of these items is impossible.

If material-information-button f of the main screen shown in FIG. 3 is chosen, it will change on the material information screen.

The material information screen is shown in FIG. 4.

The main input items configured on the screen are explained.

The dimensions input item f1 inputs the dimensions (the length, the width, depth) of the molding manufactured by the modified die used as the object of concern, respectively.

The product volume input item f2 inputs the product volume of the molding.

The product weight input item f3 inputs the product weight of the molding.

The spool runner weight input item f4 inputs the weight of the spool runner who is needed in the case of manufacture of the molding.

Although direct input of the numerical value can also be carried out to the input item f4, the value calculated from the value of the product weight and the past actual result is displayed automatically.

Here, the value calculated automatically is displayed noting that the spool runner rate is 30.5%.

The product projection-area input item d7 inputs the projection area of the molding.

Although direct input of the numerical value can also be carried out to the input item f7, the value calculated as a product of the product length and the product width is displayed automatically.

If the process information button g of the main screen shown in FIG. 3 is chosen, it will change on the process information screen.

The process information-screen is shown in FIG. 5.

The production capacity of the injection molding machine which equips the modified die used as the object of concern is displayed on the display item e2 of the screen of FIG. 5.

It writes with the tonnage and the production capacity of the injection molding machine is the 18 t, the 30 t, the 55 t, the 80 t, the 100 t, the 170 t, the 220 t, and the 280 t.

There are the 15 kinds (the 350 t, the 450 t, the 550 t, the 650 t, the 850 t, the 1300 t, and 1600 t).

The production capacity is automatically determined according to the dimensions (length, width, depth) of the molding and the contents of the product projection area, and the production capacity of the determined injection molding machine is displayed on the display item.

However, the person who wants an estimate cost can change the displayed production capacity from the pull-down menu.

In addition, detail of the specific approach of the production capacity is given later.

If sub-part-information-button h of the main screen shown in FIG. 3 is chosen, it will change on the sub-part information screen.

The sub-part information screen configures the input items, such as the use number, the sub-part number of the sub-part, SFX, the unit price, and the object of management. The information inputted in the screen is needed in the case of the estimate of the manufacturing cost of a new die, and a description thereof will be omitted.

If the die cost information button i of the main screen shown in FIG. 3 is chosen, it will change on the die cost information screen.

Figure 6:
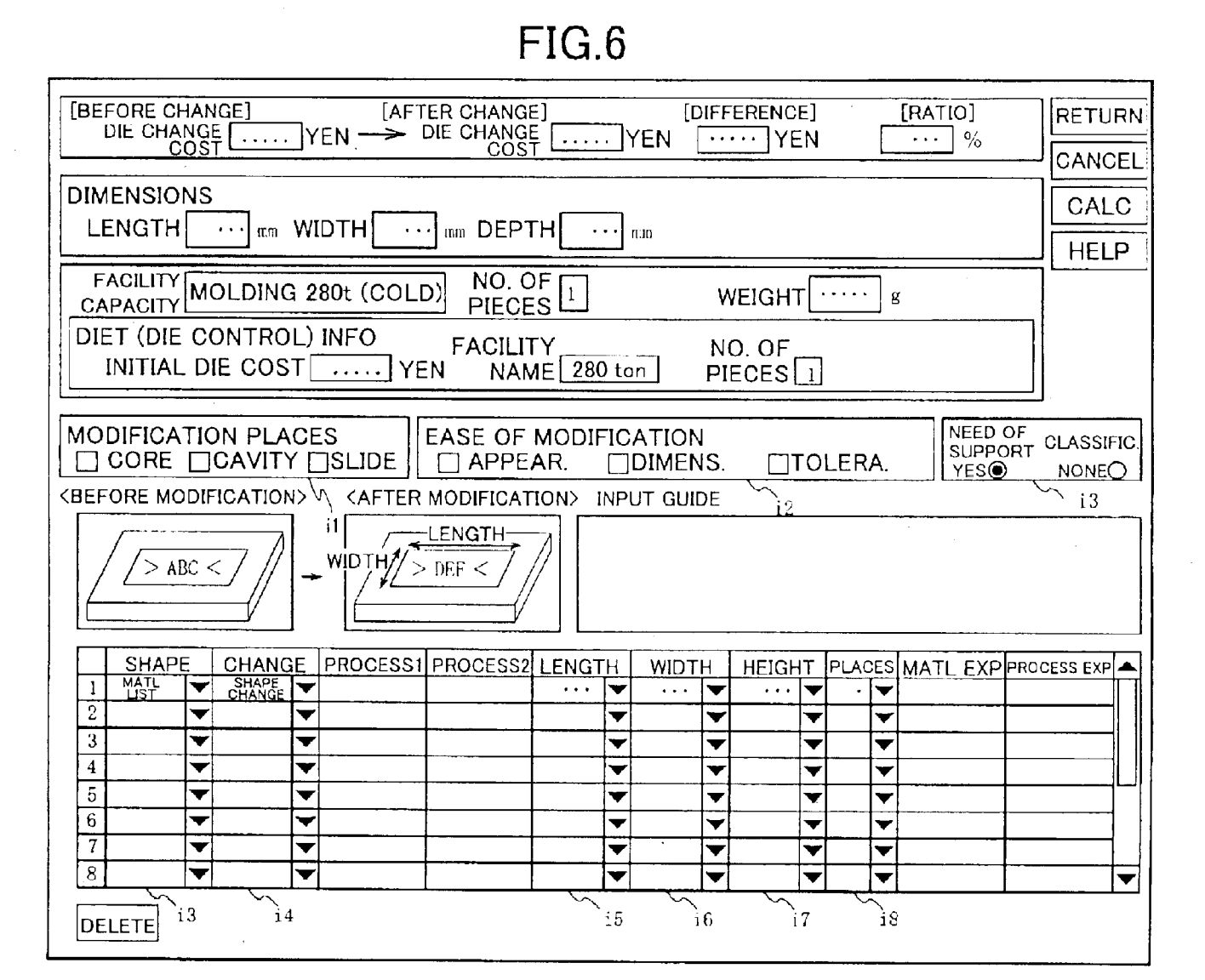

The die cost information screen is shown in FIG. 6.

The modification part input item i1, the ease-of-modification input-item i2, and the need-of-support-class input item i3 are configured in the center of the screen.

The modification part input item it chooses the modification part of the modified die used as the object of concern from either of the slide parts the core and cavity side.

The ease-of-modification input-item i2 chooses the difficulty of the modification part of the modified die used as the object of concern from the 0 or first class part of the appearance appointed side and dimension grade, or the geometric tolerance appointed side.

The need-of-support-class input item i3 chooses the existence of the need-of-support class.

In the screen lower part, the shape input item i3, the change-item input item i4, the L-value input item i5, the W-value input item i6, the H-value input item i7, and the number-of-places input item i8 are configured.

The shape input item i3 chooses the shape of the modification part of the die used as the object of concern from the rib, the round hole, the variant hole, the boss, the material list, the louver, the projection, the recess, the slide core, or the loose core.

The change-item input item i4 chooses from the new addition, deletion, expansion, reduction, shape change, or the transfer the change item about the shape chosen from the shape input item i3.

The L-value input item i5 inputs the L-value of the dimension of the modification part.

The W-value input item i6 inputs the W-value of the dimension of the modification part.

The H-value input item i7 inputs the H-value of the dimension of the modification part.

The number-of-places input item i8 inputs the number-of-places of the modification part.

In addition, it is not sometimes common to determine each dimension of the modification part as the length, the width, and the depth for the contents of the modification part.

For example, the dimensions of the rib shape part are determined by the die length, width and depth, but the round-hole shape and the boss shape are determined by the contour and the height only.

The input guide display item in the middle left of the screen displays the guide information of which estimates the correspondence relation between the factors which determine the dimensions about each shape part, the L-value input item i5, the W-value input item i6 and the H-value input item i7, and they are notified to the operator.

When based on the direct input mentioned to the first, it is necessary to carry out the manual input of the whole of each input item explained above.

However, as for the preferred embodiment, preparing other two input approaches can avoid the troublesomeness of the input, when it just mentions above and these are used.

If this is explained concretely, about the approach of calling as a key the part number and suffix which are the second input approach first, it can use by choosing the reading button e of the main screen lower berth of FIG. 3.

This changes on the non-illustrated estimated data reading screen.

The person who wants an estimate cost can call the input data at the time of performing the corresponding estimate in the past by specifying the part number predetermined on the screen, and the suffix.

Since the called data are displayed on each input item, the person who wants an estimate cost can be estimated by correcting only difference with specification of the contents inputted in the past and these contents of the modification.

And the approach of being the 3rd input approach of calling the default value prepared beforehand can be used by choosing CAD information confirmation-button 1 on the right-hand side of the main screen of FIG. 3.

This changes on the CAD information confirmation screen of FIG. 7.

On the CAD information confirmation screen, the predetermined file for CAD is read, and although the read drawing factor of the file is analyzed and each parameter required for the estimate of the modified die can be acquired automatically, for details, explanation here is omitted.

Figure 8:
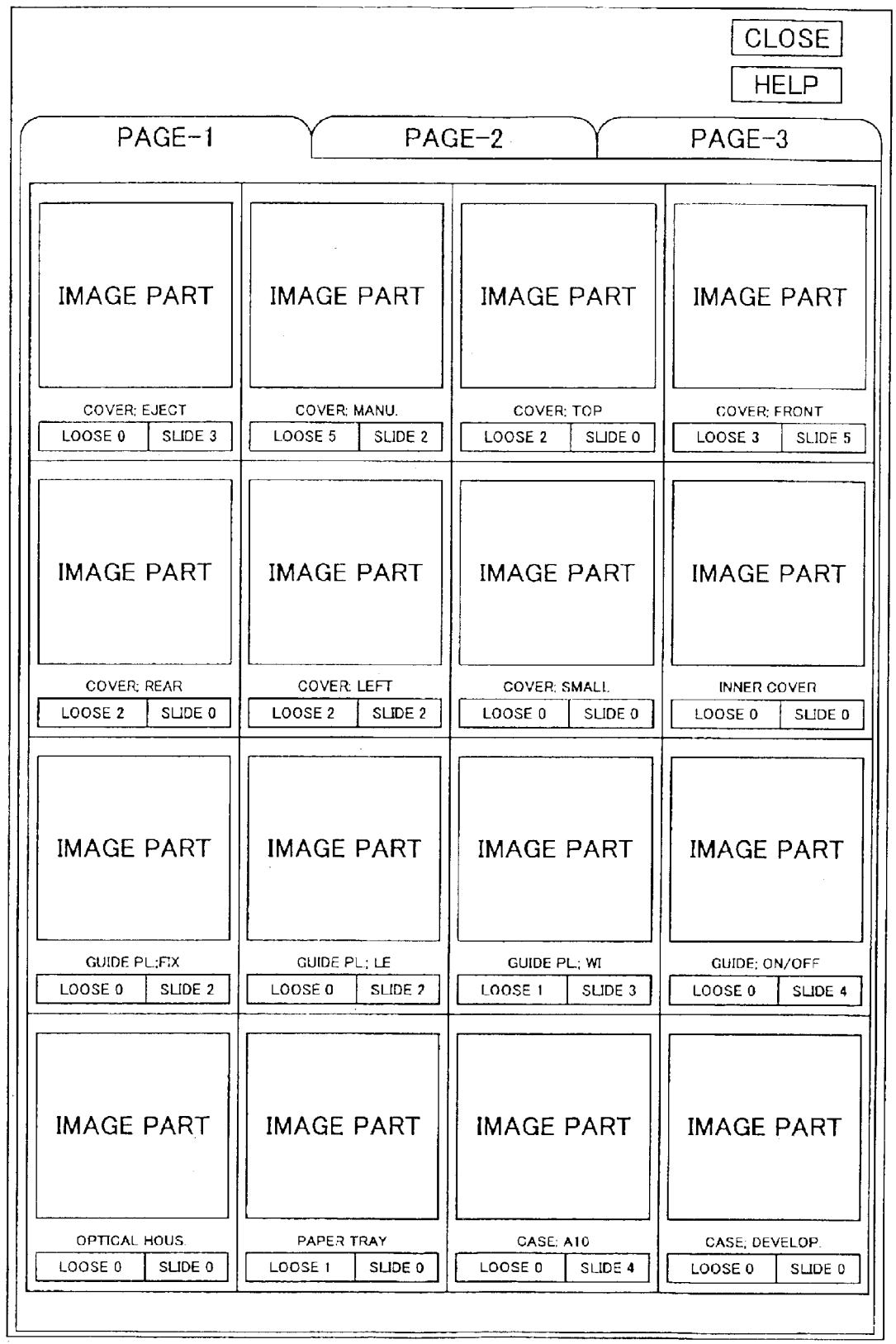
FIG. 8 is a diagram showing the molding image selection screen.

And if the form button on the left-hand side of the CAD information confirmation screen is chosen, it will change on the image selection screen classified by molding form shown in FIG. 8.

The thumbnail images of the various moldings are configured on the screen.

It sets to the preferred embodiment and is the storage unit 4.

Correlation with the default value of the value for performing the general estimate about the die which manufactures the classification of the molding and the molding to the predetermined range of 1 is stored beforehand.

Specifically, the contents of the modification are specified by the form input item a3, the material code-input column c3, the plate number input item d2, the set-number input item d4, the product volume input item f2, the product weight input item f3, and the spool runner weight input item f4.

The default value corresponding to this is displayed on each input item when the thumbnail image of one of the moldings is chosen from the image selection screen classified by molding form.

The person who wants an estimate cost inputs each input item configured on the die cost information screen while inputting the number of monthly lots which is insufficient data, the total number of the lots, and the dimensions (the length, the width, the depth).

All the contents of the modification required for the estimate can be specified, and troublesome input operation can be avoided.

Even if it is the case where any of the approach of calling as a key the approach, part number, and suffix which carry out direct input of all the items of the input item, and the method of calling the default value beforehand prepared for every classification of the molding are chosen.

In order to estimate modification cost of the die, the part number, the suffix, the form, the monthly lot, the total lot, the material code, and the number of the die plates, the set number, the dimensions (the length, the width, the depth), the product volume, the product weight, the spool runner weight, the product projection area, the process information, the machining number-of-places, the ease-of-modification, the need-of-support classification, the modification shape, the change item, the L-value, the W-value, the H-value, and the number-of-places need to be specified.

And after specification of the contents of the modification, when the die cost calculation list button k of the main screen of FIG. 3 is chosen, the processing unit 44 reads the calculation reference values of the estimated cost corresponding to the specified contents of the modification from the storage unit 41 (S200). The processing unit 44 reads the estimate functions to which the calculation reference values are input, from the storage unit 41 (S300).

And the processing unit 44 calculates the estimated costs corresponding to the cost items by the calculation reference values of the estimated cost and the estimate functions respectively (S400).

The processing unit 44 stores the calculated estimated costs to the storage unit 41 (S500).

As mentioned above, the cost items of the die modification could be classified into the material expense, the nitriding expense, design/program expense, the machining expense, the polishing expense, the break-up expense, the assembly and arrangement expense, the try expense, the measurement expense, the try-material expense, the general management sales expense, the material administrative expenses, and the profits expense. In the hard disk of the storage unit 41, the estimate functions corresponding to the respective cost items are stored.

Therefore, according to the predetermined order, the processing unit 44 repeats processing of the above steps S200–S500 until the estimated costs of all the items are calculated.

When the estimated costs of all the items are calculated, the processing unit 44 reads the estimated cost for every cost item from the storage unit 41 (S600).

The processing unit 44 calculates the total amount of the estimated costs for the modification cost according to the specified contents of the die modification by adding together the respective estimated costs which are read from the storage unit 41 (S700).

The processing unit 44 outputs the calculated estimated cost for every cost item, and the total amount of the estimated costs is outputted to the output unit 43 (S800).

The estimated cost for every cost items and the total amount of the estimated costs are outputted as the die-modification cost calculation list screen.

The die-modification expense calculation list screen is shown in FIG. 9.

The part number of the components used as the object of concern, the suffix, the production base, the form, and the components name are displayed on the top of the screen.

The total number of the lots, the set number per die, and the capacity of the injection molding machine to be used are displayed below the top of the screen.

The total amount of the estimated cost of the die-modification cost calculated at the step S700 and each estimated cost calculated at the step S600 according to the cost items, respectively are displayed in the middle of the screen.

The items of the material expense and the machining related time for every die machining facility are displayed on the bottom of the screen.

In the preferred embodiment, the estimate function for every cost items which calculates each estimated cost according to the cost items of die-modification cost, and the calculation reference value inputted into the estimate function as a parameter are stored in the storage unit 41 in advance. When the specification of the contents of die modification is received, the estimated cost is calculated by extracting the calculation reference values and the estimate functions, corresponding to the specified contents of the die modification, from the storage unit 41.

The calculation reference value inputted into each estimate function which calculates the material expense, the disposal cost, the design/program expense, the machining expense, the polishing expense, the break-up expense, the assembly and arrangement expense, the try expense, the measurement expense, the try-material expense, the general management sales expense, the material administrative expenses, or the profits expense, and the estimate function as a parameter will be described below.

[Calculation of the Machining Expense]

The expense which the modification machining of the die is performed using the die-modification facility, and is produced in connection with this is the machining expense.

The machining expense is classifiable into the facility and shared expense which is the material cost generated at the time of operation of the die machining facility, the labor and shared expense which is the human cost generated at the time of operation of the machining facility, and the facility setup expense which is produced in the preparation phase before operation of the die-modification facility and which is material and human cost.

That is, the frame which added together the facility and shared expense, the labor and shared expense, and the facility setup expense will be added up as a machining expense.

Moreover, it is common for the machining of the die not to be performed by the single die machining facility, and to be carried out using each die machining facilities, such as the machining center (MC), the milling machine, the electric discharge machine, the wire cutting machine (WC), the surface grinding machine, the radial ball (RB) machine, and the hand tap.

And each die machining facility has the individual working characteristic, respectively, and the rental rate, facility operation expense, etc. around unit time used as the foundations of the cost calculation accompanying these use differ from each other according to the kind of die machining facility.

Then, in the preferred embodiment, the machining expense is calculated by adding together the machining expense according to facility which calculated the facility and shared expense for every die machining facility, the labor and shared expense, and the setup expense classified by facility, respectively, and calculated them.

Hereafter, the processing which the processing unit 44 performs in calculation of the machining expense is explained in order, referring to the flowchart shown in FIG. 10.

First, the processing unit 44 reads the machining pattern corresponding to the change item inputted from the shape and the change-item input item i4 which are inputted from the type cost information input item i3 from the machining pattern table of the storage unit 41 (S11).

The concrete contents are shown for the machining pattern table in FIG. 11.

The table defines the machining pattern which realizes the machining according to the shape and the contents of change.

In the preferred embodiment, there are 13 kinds of machining patterns: the new insert, the rib shape, the boss shape, the round-hole shape, the louver shape, the material list, the MC&EDM shape, the MC three-dimensions shape, the EDM shape, the new slide core, and the new loose core.

And the identifier of one of the 13 kinds of machining patterns is made to correspond to the shape and the change item, and the machining pattern table defines the same.

For example, when the shape is specified to be the "rib" and the contents are specified to be, "the new addition" in the die cost information screen, the processing unit 44 reads the machining pattern: the rib shape. Moreover, there is a case in which two machining patterns are selected. For example, when the shape is specified to be the "rib" and the contents are specified to be the "shape change", the processing unit 44 reads the two machining patterns: "new insert die machining" and "rib shape die machining".

Next, the processing unit 44 calculates the machining time classified by contents of the machining, and stores the calculated machining time classified by contents of the machining to the storage unit 41 (S12).

In the step S12, the processing unit 44 will first read the identifier of each contents of the machining defined in the calculation condition table classified by machining pattern corresponding to the machining pattern which is specified.

And the identifier of the calculation reference value corresponding to each content of the machining and the calculation formula is read further.

Each machining time classified by contents of the machining is calculated by inputting the read calculation reference value into the estimate function specified by the identifier of the read calculation formula.

Furthermore, when this is explained in full detail, there are the contents of the machining, the calculation formula, calculation conditions (factor), classification, and the setup in the field which constitutes the calculation condition table classified by machining pattern stored in the storage unit 41.

The identifier of the contents of the machining which are needed in each machining pattern is defined in the field of "the contents of the machining."

The identifier of the calculation formula used for the estimate corresponding to each contents of the machining is defined in the field of the "calculation formula."

The calculation reference value inputted into the estimate function specified by the identifier of the calculation formula as a parameter is defined in the field of "the calculation conditions (factor)."

It is "length=L-value+1 besides the case where the constant is defined as having called it "longitudinal=0.8" and "hole number-of-places=1" as a calculation reference value in the field of the "the calculation condition (factor)."

As it is called 0", the "width=W-value+10", and the "depth=H-value", there is the case where the calculation reference value is defined using as a variable the L-value inputted from the L-value input item i5, the W-value inputted from the W-value input item i6, and the H-value inputted from the H-value input item i7.

Moreover, although there is the case where the calculation reference value of "x2" is defined, about this, the value calculated by the estimate function is doubled two.

About the case where the calculation reference value of "x4" is defined, the value calculated by the estimate function is doubled four.

And the classification of the contents of the machining is defined in the field of the classification.

There are the four kinds of these classification, the machining expense, the material expense, the disposal cost, and the polishing machining expense.

The field of the classification calculates the machining expense based on the "machining expense" and each record with which it is set up, and the below-mentioned polishing machining expense is calculated based on the record set up with the "polishing machining expense" in the below-mentioned disposal cost based on the record set up with the "disposal cost" in the below-mentioned material expense based on the "material expense" and the record set up in the case of calculation of the machining expense.

The field of the "setup" defines the number of times of the setup corresponding to each contents of the machining.

Here, the concrete contents of the calculation condition table classified by machining pattern corresponding to the 13 kinds of machining patterns are explained in order below.

FIG. 12 shows the calculation condition table classified by machining pattern of the new insert.

The table contains each content of the new-insert material purchase, the hex machining, the tap machining for attachment, the machining of the hex finish, the through hole and counter-bore machining for insert attachment, the counter-sink machining, the electrode purchase for corner finishing, the electrode machining for corner finishing, the corner finishing e.d. roughing, the corner finishing e.d. finishing, and the polishing machining. The table, defines the records which associate the identifier of the calculation formula, the calculation conditions (factor), classification, and the setup time with the contents.

When the machining pattern of the new insert is determined in the S11 step, the processing unit 44 reads from the table the hex machining to which the value of the field of the classification is set with the "machining expense", the tap machining for attachment, the hex finish, the through hole and counter-bore machining for insert attachment, the calculation reference value corresponding to each contents of the machining of the counter-sink machining, the electrode purchase for corner finishing, the electrode machining for corner finishing, the corner finishing e.d. roughing, the corner finishing e.d. finishing, and the identifier of the calculation formula. Then the processing unit 44 calculates the machining time classified by contents of the machining mentioned above.

FIG. 13 shows the calculation condition table classified by machining pattern of the rib shape.

The record with which the table associated each contents of the machining of the electrode purchase for rib shapes, the rib shape electrode machining, rib shape electric discharge machining, the rib shape e.d. finishing, and the polishing machining, and the identifier of the calculation formula corresponding to this, calculation conditions (factor), classification and the setup time is defined.

And in the step S11, when the machining pattern of the rib shape is determined, the processing unit 44 calculates the machining time classified by contents of the machining which the value of the field of the classification read the "machining expense", the calculation reference value corresponding to each contents of the rib shape electrode machining, the rib shape e.d. roughing and the rib shape e.d. finishing, and the identifier of the-calculation formula from the table.

FIG. 14 shows the calculation condition table classified by machining pattern of the boss shape.

The record with which the table associated each contents of the machining of the center hole drilling, the prepared hole drilling, the boss shape finishing, and the polishing machining, and the identifier of the calculation formula corresponding to this, calculation conditions (factor), classification and the setup time is defined.

And when the machining pattern of the boss shape is determined in the step S11, the processing unit 44 calculates the machining time classified by contents of the machining which the value of the field of the classification read the "machining expense", the calculation reference value corresponding to each contents of the machining of the center hole drilling and prepared hole drilling which are set up, and the boss shape finishing, and the identifier of the calculation formula from the table.

FIG. 15 shows the calculation condition table classified by machining pattern of the round-hole shape.

The record with which the table associated each contents of the machining of insert-pin purchase, the center hole drilling, the prepared hole drilling, the end milling, the reaming, the inverse relief drilling, the inverse counter bore end milling, and the polishing machining, and the identifier of the calculation formula corresponding to this, calculation conditions (factor), classification and the setup time is defined.

When the machining pattern of the round-hole shape is determined in the step S11, the processing unit 44 reads from the table the center hole drilling to which the value of the field of the classification is set with the "machining expense", the calculation reference value corresponding to each contents of the machining of the prepared hole drilling; the end milling, the reaming, the inverse relief drilling, the inverse counter bore end milling and the identifier of the calculation formula. Then, the processing unit 44 calculates the machining time classified by contents of the machining mentioned above.

FIG. 16 shows the calculation condition table classified by machining pattern of the louver shape.

The table contains records which are defined to associate the insert material purchase, the hex machining, the tap machining for attachment, the hex finish, the through hole and counter-bore machining for insert attachment, the counter-sink machining, the electrode purchase for corner finishing, the electrode machining for corner finishing, the corner finishing e.d. roughing, the corner finishing e.d. finishing, the respective contents of the machining of the louver shape machining, the rib shape (MC) machining, and the polishing machining, with the identifier, the calculation conditions (factor), the classification, and the setup time of the calculation formula.

When the machining pattern of the louver shape is determined in the step S11, the processing unit 44 reads from the table the hex machining, the tap machining for attachment to which the value of the classification is set with the "machining expense", the hex finish, the through hole and counter-bore machining for insert attachment, the counter-sink machining, the electrode machining for corner finishing, the calculation reference value corresponding to each contents of the machining of the corner finishing e.d. roughing, the corner finishing e.d. finishing, the louver shape machining, the rib shape (MC) machining, and the identifier of the calculation formula. Then, the processing unit 44 calculates the machining time classified by contents of the machining.

FIG. 17 shows the calculation condition table classified by machining pattern of the material list.

The record with which the table associated each contents of the machining of insert material purchase, the hex machining, the prepared hole and tap machining for attachment, the hex finish, the material-list character machining, and the polishing machining, and the identifier of the calculation formula corresponding to this, calculation conditions (factor), classification and the setup time is defined.

When the machining pattern of the material list is determined in the step S11, the processing unit 44 reads from the table the hex machining, to which the value of the field of the classification is set with the "machining expense", the calculation reference value corresponding to each contents of the machining of the prepared hole and tap machining for attachment, the hex finish, the material-list character machining, and the identifier of the calculation formula. Then, the processing unit 44 calculates the machining time classified by contents of the machining mentioned above.

FIG. 18 shows the calculation condition table classified by machining pattern of the MC and EDM shape.

The record with which the table associated each contents of the machining of MC three-dimensions shape machining, electrode-material purchase, the discharge-electrode shape machining, the e.d. finishing, and the polishing machining, and the identifier of the calculation formula corresponding to this, calculation conditions (factor), classification and the setup time is defined.

When the machining pattern of the MC & EDM shape is determined in the step S11, the processing unit 44 reads from the table the value of the field of the classification is set up with the "machining expense" among the records of each [these] contents of the machining.

The calculation reference value corresponding to each contents of the machining of MC three-dimensions shape machining, electrode-material purchase, the discharge-electrode shape machining, and the e.d. finishing and the identifier of the calculation formula are read from the table, and the machining time classified by contents of the machining mentioned above is calculated.

FIG. 19 shows the calculation condition table classified by machining pattern of MC three-dimensions shape.

The record with which the table associated each contents of the machining of MC three-dimensions shape machining and the polishing machining, and the identifier of the calculation formula corresponding to this, calculation conditions (factor), classification and the setup time is defined.

And, in the step S11, when the machining pattern of MC three-dimensions shape is determined, the processing unit 44 calculates the machining time classified by contents of the machining which the value of the classification read the "machining expense", the calculation reference value corresponding to the contents of the machining of MC three-dimensions shape machining, and the identifier of the calculation formula from the table, and mentioned above.

FIG. 20 shows the calculation condition table classified by machining pattern of the EDM shape.

The record with which the table associated each contents of the machining of electrode-for-electric-spark-machining purchase, the electrode-for-electric-spark-machining shape machining, the three-dimensions shape e.d. roughing, the three-dimensions shape e.d. finishing, and the polishing machining, and the identifier of the calculation formula corresponding to this, calculation conditions (factor), classification and the setup time is defined.

And in the step S11, when the machining pattern of the EDM shape is determined, the processing unit 44 calculates the machining time classified by contents of the machining which the value of the classification read the "machining expense", the calculation reference value corresponding to each contents of the machining of the electrode-for-electric-spark-machining shape machining, the three-dimensions shape e.d. roughing, and the three-dimensions shape e.d. finishing, and the identifier of the calculation formula from the table.

FIG. 21 shows the new slide core machining calculation condition table in which the new slide core calculation condition is classified by the machining pattern.

The record with which the table associated each contents of the machining of the steel-materials purchase for the slide cores, the standard-item purchase for the slide cores, slide-core nitriding, and the slide-core device portion machining, and the identifier of the calculation formula corresponding to this, calculation conditions (factor), classification and the setup time is defined.

And in the step S11, when the new slide core machining pattern is determined, the processing unit 44 calculates the machining time classified by contents of the machining which the value of the field of the classification read the "machining expense", the calculation reference value corresponding to the contents of the machining of the new slide-core device portion machining, and the identifier of the calculation formula.

FIG. 22 shows the new loose core machining calculation condition table classified by the machining pattern.

The record with which the table associated each contents of the machining of the steel-materials purchase for the loose cores, the standard-item purchase for the loose cores, loose-core nitriding, and the loose-core device portion machining, and the identifier of the calculation formula corresponding to this, calculation conditions (factor), classification and the setup time is defined.

And in the step S11, when the new loose core die machining pattern is read, the processing unit 44 calculates the machining time classified by contents of the machining which the value of the field of the classification read the "machining expense", the calculation reference value corresponding to the contents of the machining of the new loose-core device portion machining, and the identifier of the calculation formula from the table.

Next, the estimate function corresponding to each identifier defined in the field of the "calculation formula" of the above-mentioned calculation condition table classified by machining pattern is explained for every die machining facility which processes it.

There are the calculation formulas (1) to (9) which are the estimate functions of the machining time classified by contents of the machining corresponding to the contents of the machining by the machining center.

$$MC \text{ Drilling Time} = (\text{unit machining time}) \times (\text{number of holes}) \times (\text{machining coefficient}) \times (\text{material coefficient}) \quad (1)$$

$$MC \text{ Roughing Time} = (\text{length} \times \text{width} \times \text{depth})/1000/(\text{unit machining amount})/60 \quad (2)$$

$$MC \text{ Finishing Time} = \{(\text{length} \times \text{width}) + (\text{length} \times \text{depth} + \text{width} \times \text{depth}) \times 2\}/(\text{unit machining amount})/60 \quad (3)$$

$$MC \text{ 3D Shape Roughing Time} = (2/3 \times \text{length} \times \text{width} \times \text{depth})/1000/(\text{unit machining amount}) \times (\text{material coefficient})/60 + (\text{depth})/(\text{cutting amount}) \times 5/3600 \quad (4)$$

$$MC \text{ 3D Shape Rough Finishing Time} = (\text{length} \times \text{width} + \text{length} \times \text{depth} + \text{depth} \times \text{width})/(\text{unit machining amount}) \times (\text{material coefficient})/60 + (\text{depth})/(\text{cutting amount}) \times 5/3600 \quad (5)$$

$$MC \text{ 3D Shape Finishing Time} = (\text{length} \times \text{width} + \text{length} \times \text{depth} + \text{depth} \times \text{width})/(\text{unit machining amount}) \times (\text{material coefficient})/60 + (\text{depth})/(\text{cutting amount}) \times 5/3600 \quad (6)$$

$$MC \text{ 3D Shape Finish Polishing Time} = (\text{length} \times \text{width} + \text{length} \times \text{depth} + \text{depth} \times \text{width})/(\text{unit machining amount}) \times (\text{material coefficient})/60 + (\text{depth})/(\text{cutting amount}) \times 5/3600 \quad (7)$$

$$MC \text{ 3D Shape Details Machining Time} = 2 \times (\text{length} \times \text{width}) \times 0.81/1000 \text{ (unit machining amount)} \times (\text{material coefficient})/60 + (\text{depth})/(\text{cutting amount}) \times 5/3600 \quad (8)$$

$$MC \text{ Rib Machining Time} = (\text{rib length}) \times (\text{rib width})/(\text{feeding speed} \times \text{cutting amount})/60 \quad (9)$$

The above calculation formula (1) is defined in the field of the "calculation formula" of the calculation condition table classified by machining pattern.

The tap machining for attachment, and the through hole and counter-bore machining for insert attachment when it corresponds with the identifier of "MC hole machining time" and the machining pattern of the new insert is determined at the step S11, the center hole drilling when the machining pattern of the boss shape is determined.

The center hole drilling when the machining pattern of the round-hole shape is determined.

The prepared hole drilling, the end milling, reaming, the inverse relief drilling, and each machining time classified by contents of the machining of the tap machining for attachment when the machining pattern of the inverse counter bore end milling and the louver shape is determined, and the through hole and counter-bore machining for insert attachment is calculated by the calculation formula.

Moreover, the unit machining time of the above-mentioned calculation formula (1) is the machining time per hole number-of-places (the unit is the hour/piece), and it can be acquired from the unit machining time table (not shown) classified by contents of MC machining.

The table associates the center hole drilling, the prepared hole, the counter boring, the reaming, each contents of the machining of the tap, and each unit machining time (the unit is hour/the number-of-places) corresponding to this.

Furthermore, the number of places of the calculation formula uses the calculation reference value defined in the field of the "calculation conditions (factor)" of each above-mentioned calculation condition table classified by machining pattern.

Moreover, the machining coefficient of the calculation formula (1) can be acquired from MC hole machining time machining coefficient table stored in the storage unit 41.

The contents of MC hole machining time machining coefficient table are shown in FIG. 23.

The table associates the machining coefficient corresponding to board thickness and the bore diameter.

Since the field of the "calculation conditions (factor)" of the above-mentioned calculation condition table classified by machining pattern defines "board thickness" of the table, and the value of the "bore diameter", the processing unit 44 can determine the machining coefficient from the value of the board thickness acquired from the calculation condition table classified by pattern, and the bore diameter.

Moreover, the material coefficient of the calculation formula (1) is set to 1.

The above calculation formulas (2) and (3) correspond to the identifier of "MC counter-sink machining time" which the field of the "calculation formula" of the calculation condition table classified by machining pattern defined, and each machining time classified by contents of the machining of the counter-sink machining when the machining pattern of the louver shape is determined at the step S11 is calculated by the calculation formulas.

The MC counter sinking process is divided into the roughing process and the finishing process. The calculation formula (2) of rough time and the calculation formula (3) of finish time are prepared, and the processing unit 44 calculates the machining time classified by contents of the machining of MC counter-sink machining by adding together the machining time separately calculated by these calculation formulas.

The calculation reference value defined in the field of the "calculation conditions (factor)" of the calculation condition table classified by machining pattern is used for the length of both the calculation formula, the width, and the depth.

Moreover, the amount of unit machining (the unit is cm$^3$/minute) of the calculation formula (2) means the volume that can be processed per minute, and the machining center can acquire it from the predetermined unit machining amount table stored in the storage unit 41.

An example of the contents of the above table is shown in FIG. 24A. The table associates the width, and the diameter of the cutting tool corresponding to this and the amount of unit machining.

Moreover, the material coefficient of the calculation formula (2) is defined in the material coefficient table stored in the storage unit 41. The contents of the above table are shown in FIG. 24B.

The table defines the material coefficient in case the quality of the material is the copper, and the material coefficient in case the quality of the material is the pre-hardened steel.

And since the field of the "calculation conditions (factor)" of the calculation condition table classified by machining pattern defines whether the quality of the material is the copper or the pre-hardened steel, the processing unit 44 can acquire the material coefficient corresponding to the contents of the quality of the material acquired from the calculation condition table classified by pattern from the table.

The above calculation formulas (4) to (8) correspond to the identifier of "MC three-dimensions shape machining time" defined in the field of the "calculation formula" of the calculation condition table classified by machining pattern. The machining pattern of the boss shape is determined at the step S11. The MC three-dimensions shape machining when the machining pattern of the material list is determined. The MC three-dimensions shape machining and the discharge-electrode shape machining when the machining pattern of the MC&EDM shape is determined. Each machining time classified by contents of the machining of the electrode-for-electric-spark-machining shape machining when MC three-dimensions shape machining when the machining pattern of MC shape is determined, and the machining pattern of the EDM shape are determined is calculated by the calculation formula (4) or (8).

The three-dimensions shape machining by MC rough-machines first, and passes through the rough-machining machining, the finish, the finishing polishing machining, and the process of performing the details machining further, after that.

Therefore, the calculation formula (4) of rough time and the calculation formula (8) of finish time are prepared, and the processing unit 44 calculates the machining time classified by contents of the machining of MC three-dimensions shape by adding together the rough time separately calculated by these calculation formulas, roughing time, finishing time, finish polishing time, and other machining time.

The calculation reference value defined in the field of the "calculation conditions (factor)" of the calculation condition table classified by machining pattern is used for the length, the width or the depth of the calculation formula (8). Moreover, the material coefficient of the calculation formulas (4) to (8) is set to 1.

Furthermore, the amount of cutting in the calculation formulas (4) to (8) can be acquired from the predetermined table stored in the storage unit 41.

The calculation formula (9) corresponds to the identifier of "MC rib machining time" which the field of the "calculation formula" of the calculation condition table classified by machining pattern defines, and each machining time classified by contents of the machining of the tap machining for attachment when the machining pattern of the louver shape is determined at the step S11, and the through hole and the counter-bore machining for insert attachment will calculate by the calculation formula.

The calculation reference value defined in the field of the "calculation conditions (factor)" of the calculation condition table classified by machining pattern is used for the rib die length and the rib depth of the calculation formula (9).

Moreover, each value of the feed rate and the amount of slitting of the calculation formula (9) can be acquired from the amount of slitting and feed-rate table stored in the storage unit 41.

The contents of the above table are shown in FIG. 25A.

The table associates the amount of slitting and feed rate corresponding to rib width.

Therefore, the processing unit 44 can acquire the amount of slitting and feed rate corresponding to the contents of the rib width defined in the field of the "calculation conditions (factor)" of the calculation condition table classified by machining pattern from the table.

The following calculation formulas (10) to (12) provide the estimate function of the machining time classified by contents of the machining corresponding to the contents of the machining by the milling machine.

Milling Roughing Time=(surface-$A$ roughing time+surface-$B$ roughing time+surface-$C$ roughing time)×2/60

Surface-$A$ Roughing Time=(length+20)/40×(cutting cycle), Cutting Cycle=(width+20)/20×0.8, Surface-$B$ Roughing Time=(width+20)/40×(cutting cycle), Cutting Cycle=(depth+20)/20×0.8, Surface-$C$ Roughing Time=(depth+20)/40×(cutting cycle), Cutting Cycle=(length+20)/20×0.8    (10)

Milling Finishing Time (1)=(surface-$A$1 finishing time+surface-$B$1 finishing time+surface-$C$1 finishing time)×2/60

Surface-$A$1 Finishing Time=(length+20)/120×(cutting cycle), Cutting Cycle=(width+20)/20×0.8, Surface-$B$1 Finishing Time=(width+20)/120×(cutting cycle), Cutting Cycle=(depth+20)/20×0.8, Surface-$C$1 Finishing Time=(depth+20)/120×(cutting cycle), Cutting Cycle=(length+20)/20×0.8    (11)

Milling Finishing Time (2)=(surface-$A$2 finishing time+surface-$B$2 finishing time+surface-$C$2 finishing time)×2/60

Surface-$A$2 Finishing Time=(length+20)/120×(cutting cycle), Cutting Cycle=(width+20)/20×0.8, Surface-$B$2 Finishing Time=(width+20)/120×(cutting cycle), Cutting Cycle=(depth+20)/20×0.8, Surface-$C$2 Finishing Time=(depth+20)/120×(cutting cycle), Cutting Cycle=(length+20)/20×0.8    (12)

The above calculation formulas (10) to (12) correspond to the identifier defined in the field of the "calculation formula" of the calculation condition table classified by pattern.

The hex machining when it corresponds to the identifier of "milling time" and the machining pattern of the new insert is determined at the step S11, each machining time classified by contents of the machining of the hex machining when the machining pattern of the louver shape is determined is calculated by the calculation formulas (10) to (12).

First, the machining by the milling machine rough-machines and passes through the process which performs the 2 times of the subsequent finishes.

Therefore, the processing unit 44 calculates milling-cutter rough machining time by the calculation formula (10), the first milling-cutter finish time is calculated by the calculation formula (11), it calculates the second milling-cutter finish time by the calculation formula (12), and the machining time classified by contents of the machining is calculated by adding these together.

The calculation reference value defined in the field of the "calculation conditions (factor)" of the calculation condition table classified by machining pattern is used for each value of the calculation formula (10) or the length of (12), the width, and the depth.

There is the calculation formula shown in following (13) in the estimate function of the machining time classified by contents of the machining corresponding to the contents of the machining by the surface grinding machine.

Surface-Grinding-Machine Machining Time=(surface-$A$ grinding time+surface-$B$ grinding time+surface-$C$ grinding time)×2

Surface-$A$ Grinding Time=45000$^{-9}$×10×length×width×0.1×material coefficient

Surface-$B$ Grinding Time=45000$^{-9}$×10×width×depth×0.1×material coefficient

Surface-$C$ Grinding Time=45000$^{-9}$×10×depth×length×0.1×material coefficient    (13)

The above calculation formula (13) corresponds to the identifier of the "surface-grinding machining time" defined in the field of the "calculation formula" of the calculation condition table classified by machining pattern.

The hex finish when it corresponds to the identifier of "surface-grinding machining time" and the machining pattern of the new insert is determined at the above step S11, each machining time classified by contents of the machining of the hex finish when the hex finish when the machining pattern of the louver shape is determined, and the machining pattern of the material list are determined is calculated by the calculation formula.

The calculation reference value defined in the field of the "calculation conditions (factor)" of the calculation condition table classified by machining pattern is used for the length, the width or the depth of the calculation formula.

The following calculation formulas (14) and (15) provide the estimate function of the machining time classified by contents of the machining corresponding to the contents of the machining by the electric discharge machine.

Electric-Discharge Roughing Time=(length−0.2)×(width−0.2)×(depth−0.2)×7.86×(correction factor)/1000/(unit machining amount)/60    (14)

Electric-Discharge Finishing Time={(length)×(width)+((length×depth)+(width×depth))×2}×0.1×7.86×(correction factor)/(unit machining amount)/1000/60    (15)

The calculation formula (14) corresponds to the identifier of "e.d. roughing time" defined in the field of the "calculation formula" of the calculation condition table classified by machining pattern. The corner finishing e.d. roughing when it corresponds to the identifier of "e.d. roughing time" and the machining pattern of the new insert is determined at the step S11. The rib shape e.d. roughing when the machining pattern of the rib shape is determined, each machining time classified by contents of the machining of the three-dimensions shape e.d. roughing when the machining pattern of the corner finishing e.d. roughing when the machining pattern of the louver shape is determined, and the EDM shape is determined is calculated by the calculation formula.

The calculation reference value defined in the field of the "calculation conditions (factor)" of the calculation condition table classified by machining pattern is used for the length, the width or the depth of the calculation formula (14).

Moreover, the correction factor of the calculation formula (14) can be acquired from the correction-factor table stored in the storage unit 41.

FIG. 25B shows the contents of the above table.

The table associates the correction factor corresponding to the width of the calculation formula. Therefore, the processing unit 44 can acquire the correction factor corresponding to the value of the width which the field of "the calculation conditions (factor)" in the calculation condition table classified by machining pattern defined from the table.

The calculation formula (15) corresponds to the identifier of "e.d. finishing time" defined in the field of the "calculation formula" of the calculation condition table classified by machining pattern. The corner finishing e.d. finishing when it corresponds to the identifier of "e.d. finishing time" and the machining pattern of the new insert is determined at the step S11.

The rib shape e.d. finishing when the machining pattern of the rib shape is determined, each machining time classified by contents of the machining of the three-dimensions shape e.d. finishing when the machining pattern of the corner finishing e.d. finishing when the machining pattern of the louver shape is determined, and the EDM shape is determined is calculated by the calculation formula (15).

Moreover, the calculation reference value defined in the field of the "calculation conditions (factor)" of the calculation condition table classified by machining pattern is used for the length, the width or the depth of the calculation formula (15).

And the point which can acquire the correction factor from the correction-factor table of FIG. 25B is the same as that of the calculation formula (14) of the rough time.

The following calculation formula (16) provides the estimate function of the machining time classified by contents of the machining corresponding to the contents of the machining by the wire-cut electric discharge machine.

$$\text{Wire-Cut Machining Time} = 2.38 \times 10^{-3} \times (\text{machining length}) \times (\text{machining coefficient}) \times (\text{material coefficient}) \quad (16)$$

The calculation formula (16) corresponds to the identifier of "WC machining time" defined in the field of the "calculation formula" of the calculation condition table classified by machining pattern.

The electrode machining for corner finishing when it corresponds to the identifier of "WC machining time" and the machining pattern of the new insert is determined at the step S11.

Each machining time classified by contents of the machining of the electrode machining for corner finishing when the electrode-pattern shape machining when the machining pattern of the rib shape is determined, and the machining pattern of the louver shape are determined, and the louver shape machining is calculated by the calculation formula.

And the calculation reference value defined in the field of the "calculation conditions (factor)" of the calculation condition table classified by machining pattern is used for the value of the machining length of the calculation formula (16).

Moreover, the value of the machining coefficient of the calculation formula (16) can be acquired from the machining coefficient table stored in the storage unit 41.

The contents of the above table are shown in FIG. 26.

The table defines the machining coefficient corresponding to roughing (alpha), the finish (beta), the roughing+finish (1 time), the roughing+finish (2 times), each machining name of the roughing+finish (3 times), and board thickness.

The wire cut machining in the preferred embodiment is provided to estimate the machining time when the roughing and the finishing are performed once. The processing unit 44 reads out the value of the field corresponding to the machining name of the roughing+finish (1 time).

Therefore, the processing unit 44 can acquire the correction factor corresponding to the value of the board thickness which the field of "the calculation conditions (factor)" in the calculation condition table classified by machining pattern defined from the table.

Moreover, the material coefficient of the calculation formula is set to 1.

The calculation of the machining time classified by contents of the machining using the estimate function is not performed and the machining time value defined in the predetermined table is read as the machining time classified by contents of the machining.

The machining time classified by contents of the machining of the slide-core device portion machining can be acquired from setup according to slide size/machining time table stored in the storage unit 41.

The contents of the above table are shown in FIG. 27.

The table associates slide size (width, height, depth), and the setup-time value and machining time value corresponding to this.

Furthermore, since the slide-core machining performs this using MC, the surface grinding machine, the formed grinding machine, the radial drill (it is called Following R B), and the hand tap, the value which classified the setup-time value and the machining time value for every die machining facility is also defined in the table.

In the field of the "calculation conditions (factor)" of the calculation condition table classified by machining pattern, since slide size (width, height, depth) is defined as a calculation reference value, the processing unit 44 acquires the machining time value (sum total time) corresponding to this as machining time classified by contents of the machining of the slide-core device portion machining.

On the other hand, the machining time classified by contents of the machining of the loose-core device portion machining can be acquired from setup according to loose-core size/machining time table stored in the storage unit 41.

The contents of the above table are shown in FIG. 28.

The table associates loose-core size (width, depth), and the setup-time value and machining time value corresponding to this.

Since the loose-core machining performs this using MC, the milling machine, the surface grinding machine, the formed grinding machine, and WC, the value which classified the setup-time value and the machining time value for every die machining facility is also defined.

Since the field of the "calculation conditions (factor)" of the calculation condition table classified by machining pattern defines slide size (width, depth) as a calculation reference value, the processing unit 44 acquires the machining time value (sum total time) corresponding to this as machining time classified by contents of the machining of the loose-core device portion machining.

The processing unit 44 calculates each machining time classified by contents of the machining, calculates the net machining time classified by contents of the machining, and stores the calculated net machining time to the storage unit 41 (S1).

The net machining time classified by contents of the machining is calculated by the estimate function stored as the following calculation formula (17).

$$\text{Machining-item-specific Net Machining Time} = (\text{machining-item-specific machining time}) \times (\text{the number of places}) \times (\text{set number}) \quad (17)$$

The calculation formula (17) uses the value as which the set number is inputted from the set-number input item d4 of the main screen shown in FIG. 3 in the value inputted from the number-of-places input item i8 of the die cost information screen which-showed the number-of-places of the calculation formula (17) to FIG. 6.

Next, the processing unit 44 determines each die machining facility which performs the machining corresponding to the specified machining pattern (S14).

In the storage unit 41, correlation with each content of the machining of the calculation condition table classified by machining pattern and the identifier of the die machining facility to process is stored.

For example, when the rib shape is determined at the step S11, the processing unit determines WC which performs the electrode-pattern shape machining, the electric discharge machine which performs the rib shape e.d. roughing, and the electric discharge machine which similarly performs the rib shape e.d. finishing with reference to the calculation condition table classified by machining pattern of the boss shape, respectively.

And the processing unit 44 calculates the necessary machining time classified by facility, and stores the calculated machining time classified by facility to the storage unit 41 (S15).

The necessary machining time classified by facility in the preferred embodiment means the hours worked of each die machining facility which processes the die according to the specified contents of the modification.

And calculation of the machining time classified by facility is calculated by the estimate function stored in the storage unit 41 as the following calculation formula (18).

$$\text{Facility-specific Required Machining Time} = \Sigma\{(\text{machining-item-specific net machining time}) \times (\text{time value coefficient})\} \quad (18)$$

In the calculation formula (18), the time value coefficient of the calculation formula (18) can be acquired from the time value coefficient table stored in the storage unit 41.

The contents of the above table are shown in FIG. 29.

The table of FIG. 29 associates the kind of each machining facility, the corresponding time value coefficient, and the number of the facility units. The processing unit 44 can acquire the time value coefficient corresponding to each die machining facility determined at the step S14 from the table.

For example, when the case which determined the rib shape explained this and the machining pattern of the rib shape is determined in the step S11.

Although each machining time classified by contents of the machining of the electrode-pattern shape machining, the rib shape e.d. roughing, and the rib shape e.d. finishing will be calculated (S12)

Since each of rib shape e.d. roughing and rib shape e.d. finishing is the process performed by the electric discharge machine, the processing unit 44 calculates the machining time classified by contents of these machining by adding them together, and calculates the product of the time value coefficient of the electric discharge machine acquired from the time value coefficient table and the machining time classified by contents of the machining added together as necessary machining time classified by facility of the electric discharge machine.

Next, the processing unit 44 calculates the setup time according to contents of the machining, and stores the calculated setup time according to contents of the machining to the storage unit 41 (S16).

The setup time according to contents of the machining is calculated by the estimate function stored in the storage unit 41 as the following calculation formula (19).

$$\text{Machining-item-specific Setup Time} = (\text{facility-specific basic setup time}) \times (\text{machining-item-specific setup number}) \quad (19)$$

The setup basic time classified by facility of the calculation formula (19) can be acquired from the setup-time table classified by facility (not shown) which is stored in the storage unit 41.

The setup basic time table classified by facility associates the identifier of each die machining facility, and the setup basic time classified by facility which is the calculation reference value of the setup time corresponding to this.

Therefore, the processing unit 44 acquires each setup basic time classified by facility corresponding to the die machining facility determined at the step S14 from the setup basic time table classified by facility.

On the other hand, the number of times classified by contents of the machining of the calculation formula (19) of the setup uses the value defined in the field of the "setup" of the calculation condition table classified by machining pattern.

The processing unit 44 calculates the necessary setup time classified by facility, and stores the calculated necessary setup time classified by facility to the storage unit 41 (S17).

The necessary setup time classified by facility in the preferred embodiment means the set-up time before operation of the die machining facility which performs the machining according to the specified contents of the modification.

And the calculation of the necessary setup time classified by facility is performed using the estimate function stored in the storage unit 41 as the following calculation formula (20).

$$\text{Facility-specific Required Setup Time} = \Sigma\{(\text{machining-item-specific setup time}) \times (\text{time value coefficient})\} \quad (20)$$

The time value coefficient of the calculation formula (20) can be acquired from the time value coefficient table shown in FIG. 29.

The processing unit 44 calculates the net machining man-hour classified by contents of the machining, and stores the calculated net machining man-hour classified by contents of the machining to the storage unit 41 (S18).

The estimate function stored as the following calculation formula (21) performs calculation of the net machining man-hour classified by contents of the machining to the storage unit 41.

$$\text{Machining-item-specific Net Machining Man-Hour} = (\text{machining-item-specific machining time}) \times (\text{the number of places}) \times (\text{set number}) / (\text{the number of units}) \quad (21)$$

The number-of-places of the calculation formula (21) will use the value inputted from the number-of-places input item i8 of the die cost information screen, and the set number of the calculation formula (21) will use the value inputted from the set-number input item d4 of the main screen.

Moreover, the number of the calculation formula (21) can be acquired from the time value coefficient table shown in FIG. 29.

Furthermore, the processing unit 44 calculates the necessary machining man-hour classified by facility, and stores the calculated necessary machining man-hour classified by facility to the storage unit 41 (S19).

The necessary machining man-hour classified by facility in the preferred embodiment (the unit is time) means the workhours by the facility operation management of the die machining facility which performs the machining according to the specified contents of the modification.

And the estimate function stored in the storage unit 41 as the following calculation formula (22) performs calculation of the necessary machining man-hour classified by facility.

$$\text{Facility-specific Required Machining Man-Hour} = \Sigma\{(\text{machining-item-specific net machining man-hour}) \times (\text{time value coefficient})\} \quad (22)$$

The time value coefficient of the calculation formula (22) can be acquired from the time value coefficient table shown in FIG. 29.

The, processing unit 44 calculates the setup expense classified by facility, and stores the calculated setup expense classified by facility to the storage unit 41 (S20).

The estimate function stored in the storage unit 41 as the following calculation formula (23) performs calculation of the setup expense classified by facility.

$$\text{Facility-specific Setup Expense} = (\text{facility-specific required setup time}) \times \{(\text{facility/shared expense ratio}) + (\text{labor/shared expense ratio})\} \quad (23)$$

The facility and shared expense of the calculation formula (23) means the ratio of the installation cost and the ratio of facility proportional workplace common expense, and the labor and shared expense of the calculation formula (23) means the ratio of the labor cost and the ratio of labor proportional workplace common expense.

The processing unit 44 acquires the facility and shared expense ratio from the cost center (C/C) machining expense ratio table stored in the storage unit 41.

The contents of the C/C machining expense ratio table are shown in FIG. 30.

The table of FIG. 30 associates the C/C, the corresponding facility/shared expense ratio, the labor/shared expense ratio and the sum total.

The table defines the facility/shared expense ratio per hour and the labor/shared expense ratio per hour. The facility/shared expense ratio and labor/shared expense ratio which are converted by per second are also defined in the table.

In calculation of the facility and shared expense which the setup expense classified by facility using the calculation formula (23) calculates, and the labor and shared expense, the facility/shared expense ratio per hour and the labor/shared expense ratio are used (it is the same as the following calculation formulas).

In the ratio C/C machining expense ratio table of FIG. 30, the MC are classified into small size, middle size and large size, the wire electric discharge machines are classified into small size and large scale, the electric discharge machines are classified into small size and large size, the NC milling machines are classified into small size and middle size, the milling machines are classified into small size and large size, and the surface grinding machines are classified into small size and large size, and the records are divided into separate ones.

The facility/shared expense ratio differs also from the labor/shared expense ratio according to the scale of the die machining facility. Therefore, if the capacity of the die machining facility is not determined, the facility/shared expense ratio and labor/shared expense ratio which are inputted into the calculation formula (23) cannot be acquired from the C/C machining expense ratio table.

Then, in the preferred embodiment, the production capacity selection table is stored in the storage unit 41.

The contents of the production capacity selection table are shown in FIG. 31.

The table associates the molding size (mm), the corresponding bush size (mm), and the capacity of the molding machine.

The molding size of the table corresponds with the value inputted from the dimensions input item f1 of the material information screen.

Therefore, the processing unit 44 can acquire the capacity of each die machining facility corresponding to the dimensions inputted from the dimensions input item f1 from the production capacity selection table.

The processing unit 44 calculates the facility and shared expense (S21).

The estimate function stored in the storage unit 41 as the following calculation formula (24) performs calculation of the facility and shared expense.

$$\text{Facility/Shared Expense} = (\text{facility-specific required machining time}) \times (\text{facility/shared expense ratio}) \quad (24)$$

The processing unit 44 acquires the facility/shared expense ratio of the calculation formula (24) from the C/C machining expense ratio table of FIG. 30, similar to that of calculation of the setup expense classified by facility.

The processing unit 44 calculates the labor and shared expense (S22).

The estimate function stored in the storage unit 41 as the following calculation formula (25) performs calculation of the labor and shared expense.

$$\text{Labor/Shared Expense} = (\text{facility-specific required machining man-hour}) \times (\text{labor/shared expense ratio}) \quad (25)$$

The processing unit 44 acquires the labor/shared expense ratio of the calculation formula (25) from the C/C working-ratio generalization table shown in FIG. 30 similar to that of calculation of the setup expense classified by facility.

The processing unit 44 calculates the machining expense (S23).

The estimate function stored in the storage unit 41 as the following calculation formula (26) performs calculation of the machining expense.

$$\text{Machining Expense} = \Sigma(\text{facility-specific setup expense}) + \Sigma(\text{facility-specific facility/shared expense}) + \Sigma(\text{facility-specific labor/shared expense}) \quad (26)$$

The processing unit 44 displays the calculated machining expense on the column of the die-modification expense in the die-modification expense calculation list screen shown in FIG. 9.

Furthermore, the processing unit 44 sums each necessary machining time calculated at the step S15, and each necessary setup time calculated at the step S17. The machining related time for every die machining facility is calculated by adding together each necessary machining man-hour classified by facility calculated at the step S20 for every die machining facility.

The processing unit 44 displays on the machining related time display item classified by facility of the die-modification expense calculation list screen (FIG. 9) which indicates the machining related time for every calculated die machining facility.

[Calculation of Material Expense]

The material expense in the preferred embodiment is the calculation condition table classified by machining pattern corresponding to the machining pattern determined at the step S11, and is an estimated cost added up when there are the "material expense" and the classified contents of the machining.

The processing unit 44 calculates the material expense by the estimate function stored in the storage unit 41 as the following calculation formula (27).

$$\text{Material Expense} = \Sigma\{(\text{die-component-specific material expense}) \times (\text{the number of places}) \times (\text{set number})\} \quad (27)$$

The number of places of the calculation formula (27) is the number of places inputted from the number-of-places input item i8 of the die cost information screen, and the set number is the set number inputted from the set-number input item d4 of the main screen.

Moreover, the material expense according to die parts of the calculation formula (27) means each material expense of the insert material expense, the electrode-material expense for the ribs, the block electrode-material expense, the steel-materials material expense for the slide cores, the purchase standard-item material expense for the slide cores, the steel-materials material expense for loose cores, and the purchase standard-item material expense for the loose cores.

The die components used for the machining of the die include the insert, the electrode for the ribs, the block electrode, the steel materials for the slide cores, the purchase standard item for the slide cores, the steel materials for loose cores, and the purchase standard item for the loose cores. The material expenses corresponding to these components are needed.

They are based on the contents of the calculation condition table classified by machining pattern corresponding to the machining pattern determined at the step S11.

For example, when the-machining pattern of the "new insert" is determined, the processing unit 44 calculates the insert material purchase expense and the electrode purchase expense for corner finishing, and includes the same as a material expense.

A description will now be given of the calculation formula of the material expense according to die parts for every die parts.

The insert material expense is calculated by the processing unit 44 in accordance with the estimate function stored in the storage unit 41 as the following calculation formula (28).

$$\text{Insert Material Expense} = (\text{insert material weight}) \times 900 + (\text{material cutting expense}) \quad (28)$$

The calculation formula (28) corresponds to the identifier of the "insert material expense" defined in the field of the "calculation formula" of the calculation condition table classified by machining pattern.

When the new insert, the louver shape, or the machining pattern of the material list is determined at the step S11, the processing unit 44 calculates the insert material expense by the calculation formula.

The insert material weight (kg) of the calculation formula (28) is calculated by the following calculation formula (29). And the cropping expense of the calculation formula (28) is calculated by the following calculation formula (30), when the value of the thickness defined in the field of the "calculation conditions (factor)" of the corresponding calculation condition table classified by pattern is more than 90 (mm), and it calculates by the calculation formula of following (31) at the time under of 90 (mm).

Moreover, the value of 900 (yen/kg) of the calculation formula is the price per kg of the pre-hardened steel used as an insert material.

$$\text{Insert Material Weight} = \text{length} \times \text{width} \times \text{thickness} \times 7.86 \times 10^{-6} \quad (29)$$

$$\text{Material Cutting Expense} = \text{length} \times \text{width} \times 0.065 \quad (30)$$

$$\text{Material Cutting Expense} = \text{length} \times \text{width} \times 0.065 \times 1.2 \quad (31)$$

In the calculation formulas (29) to (31), the calculation reference value defined in the field of the "calculation conditions (factor)" of the calculation condition table classified by machining pattern is used for the length, the width or the thickness of the calculation formulas (29) to (31).

The rib electrode material expense is calculated by the processing unit 44 in accordance with the estimate function stored in the storage unit 41 as the following calculation formula (32).

$$\text{Rib Electrode Material Expense} = (\text{rib length}) \times 23 \quad (32)$$

The calculation formula (32) corresponds to the identifier of "electrode-material expense for the ribs" defined in the field of the "calculation formula" of the calculation condition table classified by machining pattern.

When the machining pattern of the rib shape is determined, the electrode-material expense for the ribs is calculated by the calculation formula.

The calculation reference value defined in the field of the "calculation conditions (factor)" of the calculation condition table classified by machining pattern is used for the rib die length of the calculation formula.

The block electrode material expense is calculated by the processing unit 44 in accordance with the estimate function stored in the storage unit 41 as the following calculation formula (33).

$$\text{Block Electrode Material Expense} = \text{length} \times \text{width} \times \text{thickness} \times 0.0162 \quad (33)$$

The calculation formula (33) corresponds to the identifier of the "block electrode-material expense" defined in the field of the "calculation formula" of the calculation condition table classified by machining pattern.

When the machining pattern of the louver shape is determined at the step S11, the processing unit 44 calculates block electrode-material expense by the calculation formula (33).

The calculation reference value defined in the field of the "calculation conditions (factor)" of the calculation condition hand table classified by machining pattern is used for the length, the width or the thickness of the calculation formula.

The storage unit 41 stores the charge expense table of the slide-core material corresponding to the identifier, and the processing unit 44 can acquire the steel-materials expense for the slide cores and the purchase standard-item expense for the slide cores from the above table.

The contents of the charge expense table of slide-core material are shown in FIG. 32.

The table associates the slide-core size (width, height, depth), the slide-core material size (width, height, depth) corresponding to this, the steel-materials unit price, the purchase standard-item unit price, and the total amount.

And since each value of the slide-core size (width, height, depth) is defined in the field of the "calculation conditions (factor)" of the calculation condition table classified by machining pattern, the processing unit 44 reads the charge expense of slide-core material corresponding to this from the table.

The storage unit 41 stores the charge expense table of loose-core material corresponding to the identifier, and the processing unit 44 can acquire the steel-materials expense for the loose cores and the purchase standard-item expense for the loose cores from the above table.

The contents of the charge expense table of loose-core material are shown in FIG. 33.

The table associates the loose-core size (width, depth), the loose-core material size (width, thickness, height) corresponding to this, the steel-materials unit price, the purchase standard-item unit price, and the total amount.

On the other hand, since it is only the width of loose-core size, depth, and the height, defining as the field of the "calculation conditions (factor)" of the calculation condition table classified by machining pattern cannot acquire the steel-materials unit price and the purchase standard-item unit price from the table only by this.

Then, the loose-core material height table is prepared for the storage unit 41 in the preferred embodiment.

The contents of the above table are shown in FIG. 34.

The table associates the molding size (mm), the loose-core height (mm) corresponding to this, and the loose-core material height (mm).

Therefore, the processing unit 44 first acquires the loose-core material height corresponding to the loose-core height defined in the field of the "calculation conditions (factor)" of the calculation condition table classified by machining pattern from the table, and acquires the steel-materials unit price corresponding to these contents and the contents of the loose-core size width similarly acquired from the calculation condition table, and the loose-core size depth, and the purchase standard-item unit price from the charge expense table of loose-core material.

[Calculation of Polishing Machining Expense]

The polishing machining expense in the preferred embodiment is the calculation condition table classified by machining pattern corresponding to the machining pattern determined at the step S11, and is an estimated cost added up when there are the "polishing machining expense" and the classified contents of the machining.

And the processing unit 44 calculates the material expense in accordance with the calculation function stored in the storage unit 41 as the following calculation formulas (34) to (40).

$$\text{Machining-item-specific Polishing Machining Time}=0.03\times \sqrt{[\{\text{length}\times\text{width}+2\times\text{depth}\times(\text{length}+\text{width})\}\times\text{depth coefficient}]} \quad (34)$$

$$\text{Machining-item-specific Polishing Machining Time}=0.03\times \sqrt{\{(\text{insert length}+\text{insert width})\times 2\times 10\}} \quad (35)$$

$$\text{Net Polishing Machining Time}=\Sigma\{(\text{machining-item-specific polishing machining time})\times(\text{set number})\times(\text{the number of places})\} \quad (36)$$

$$\text{Net Polishing Setup Time}=(\text{basic polishing time})+\Sigma(\text{machining-item-specific polishing setup time}) \quad (37)$$

$$\text{Required Polishing Machining Time}=(\text{net polishing machining time})\times(\text{time value coefficient}) \quad (38)$$

$$\text{Required Polishing Setup Time}=(\text{net polishing setup time})\times(\text{time value coefficient}) \quad (39)$$

$$\text{Polishing Machining Expense}=(\text{required polishing setup time})\times\{(\text{polishing facility/shared expense ratio})+(\text{polishing labor/shared expense ratio})\}+(\text{required polishing machining time})\times\{(\text{polishing facility/shared expense ratio})+(\text{polishing labor/shared expense ratio})/(\text{the number of units})\} \quad (40)$$

Figure 35:
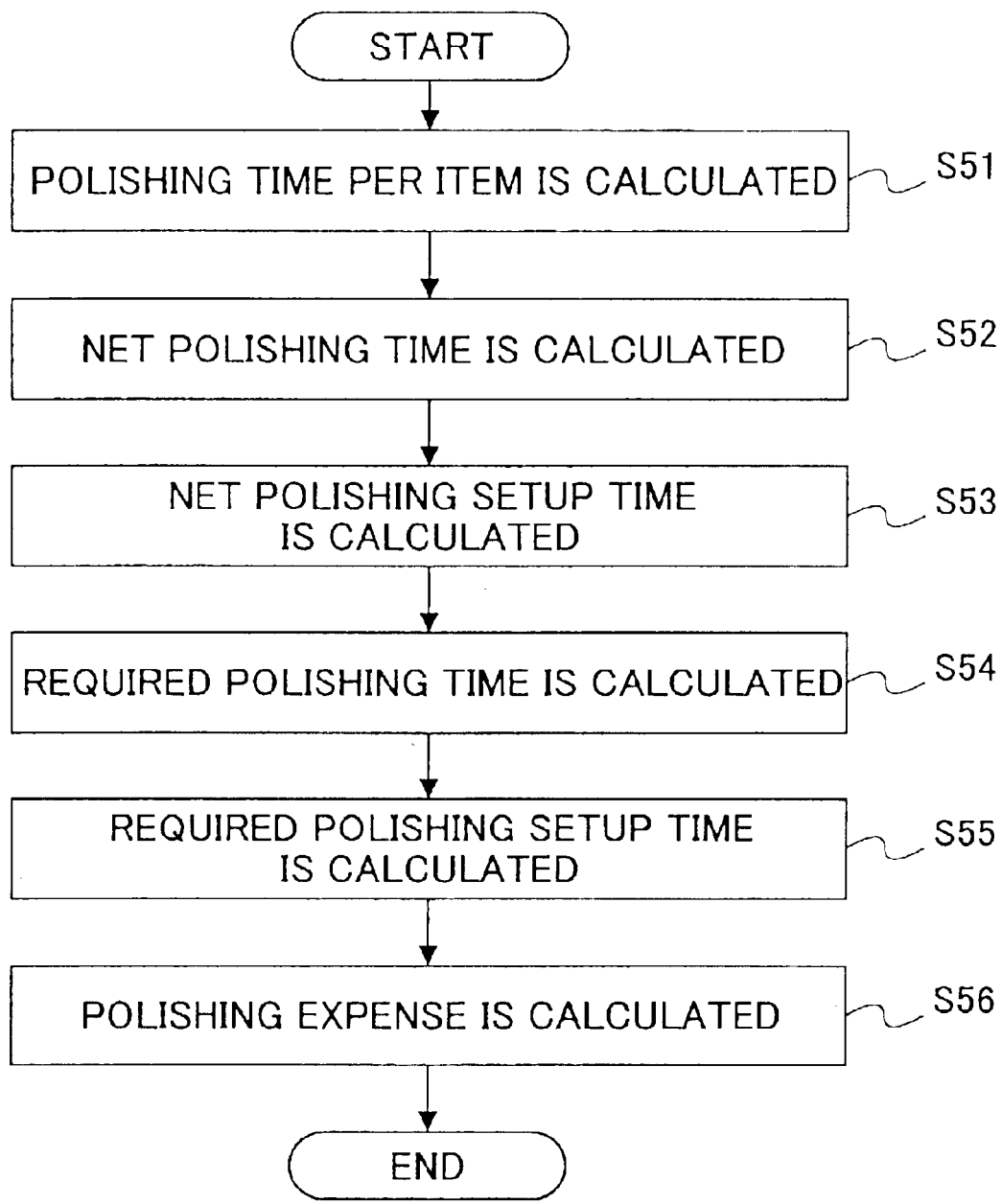
FIG. 35 is a flowchart for explaining the polishing expense calculation performed by the die modification estimate system of FIG. 1.

FIG. 35 is a flowchart for explaining calculation of the polishing machining expense using the above calculation formulas (34) to (40), which is performed by the processing unit 44.

First, the processing unit 44 calculates the polishing machining time classified by contents of the machining by the above formula (34) or (35) (S51).

Namely, when the identifier of polishing machining time (shape) is defined in the field of the "calculation formula" of the calculation condition table classified by machining pattern corresponding to the machining pattern specified at the step S11, the processing unit 44 calculates the polishing time classified by contents of the machining by the formula (34). When the identifier of polishing machining time (insert) is defined, the processing unit 44 calculates the polishing machining time classified by contents of the machining by the formula (35).

The length, width and depth of the formula (34) use the calculation reference value defined in the field of the "calculation conditions (factor)" of the calculation condition table classified by machining pattern.

Furthermore, the depth coefficient of the calculation formula (35) can be acquired from the depth coefficient table stored in the storage unit.

The contents of the depth coefficient table are shown in FIG. 25C. The table associates the depth and the corresponding depth coefficient.

The processing unit 44 acquires the depth coefficient corresponding to the value of the depth read from the field of the "calculation conditions (factor)" of the calculation condition table classified by the machining pattern from the table.

Moreover, the calculation reference value defined in the field of the "calculation conditions (factor)" of the calculation condition table classified by machining pattern is similarly used for each value of the insert length and width of the calculation formula (31).

Next, the processing unit 44 calculates polishing net machining time by the calculation formula (36) (S52).

The number-of-places of the calculation formula (36) is the value inputted from the number-of-places input item i8 of the die cost information screen, and the set number of the calculation formula (36) is the value inputted from the set-number input item d4 of the main screen.

The processing unit 44 calculates the polishing net setup time by the calculation formula (37) (S53).

The polishing basic time of the calculation formula (37) is set to 1 (hour). Moreover, the polishing setup time classified by contents of the modification of the calculation formula is set to 0.08 (hour). However, in the calculation of the polishing net setup time, the value which adds together the setup time of each contents of the machining corresponding to the machining pattern determined at the step S11 is used.

For example, the two machining patterns the "new insert" and the "rib shape" will be determined according to the machining pattern table shown in FIG. 11 when the shape is specified to be the "rib" and the contents are specified to be "shape change". It is necessary to add up the polishing machining expense about the polishing machining (insert) of the new insert, and the polishing machining (shape) of the rib shape. In this case, the processing unit 44 calculates the polishing net setup time by adding together 1 (hour) which is the polishing basic time, 0.08 (hour) which is the polishing machining setup time of the new insert, and 0.08 (hour) which is the polishing machining time of the rib shape.

The processing unit 44 calculates the polishing necessary machining time by the calculation formula (38) (S54).

The time value coefficient of the calculation formula (38) can be acquired from the time value coefficient table of FIG. 29.

The processing unit 44 calculates the required polishing setup time by the calculation formula (39) (S55).

The time value coefficient of the calculation formula (39) is acquirable from the time value coefficient table of FIG. 29.

The processing unit 44 calculates the polishing machining expense by the calculation formula (40) (S56).

The polishing facility/shared expense ratio and the polishing labor/shared expense ratio of the calculation formula (40) can be acquired from the C/C machining expense ratio table of FIG. 30.

Moreover, the calculation formula has and the number can be acquired from the time value coefficient table shown in FIG. 29.

The calculation of the polishing machining expense is thus completed.

[Calculation of the Disposal Cost]

The disposal cost in the preferred embodiment means the slide-core nitriding expense and the loose-core nitriding expense.

It is the calculation condition table classified by machining pattern corresponding to the machining pattern determined at the step S11, and is the estimated cost added up when there are the "disposal cost" and the classified contents of the machining.

The slide-core nitriding expense can be acquired from the slide-core nitriding expense table stored in the storage unit 41.

The contents of the above table are shown in FIG. 36.

The table associates the slide-core size (width×depth×height), the slide-core material size corresponding to this, and the nitriding unit price.

On the other hand, each value of slide-core width, slide-core depth, and slide-core height is defined in the field of the "calculation conditions (factor)" of the calculation condition table classified by machining pattern.

The processing unit 44 acquires the slide-core nitriding expense corresponding to the value of the "calculation conditions (factor)" of the calculation condition table classified by machining pattern from the slide-core nitriding expense table.

The loose-core nitriding expense can be acquired from the loose-core nitriding expense table stored in the storage unit 41.

The contents of the above table are shown in FIG. 37.

The table associates the loose-core size (width×depth× height), the loose-core material size corresponding to this, and the nitriding unit price.

On the other hand, only each value of loose-core size width, loose-core size depth, and loose-core size height is defined in the field of the "calculation conditions (factor)" of the calculation condition table classified by machining pattern as mentioned above.

Similar to the calculation of the loose-core steel-materials expense and steel-materials standard-item expense, the processing unit 44 acquires from the loose-core height table having shown the loose-core material height corresponding to the loose-core height defined in the calculation condition table classified by machining pattern in FIG. 34.

The nitriding unit price corresponding to the contents of the loose-core size width acquired from the calculation condition table classified by machining pattern and loose-core size depth is acquired from the loose-core nitriding expense table.

[Calculation of Design/Program Expense]

The processing unit 44 calculates design/program expense by the estimate function stored in the storage unit 41 as the following calculation formulas (41) and (42).

$$\text{Design/Program Expense}=(\text{design/program time})\times(\text{CAD/CAM/CAE facility/shared expense ratio}+\text{CAD/CAM/CAE labor/shared expense ratio}) \quad (41)$$

$$\text{Design/Program Time}=0.3\times\Sigma(\text{facility-specific machining related time})\times(\text{set number coefficient})+(\text{setup time}) \quad (42)$$

In the calculation formula (41), the CAD/CAM/CAE facility/shared expense ratio can be acquired from the C/C machining expense ratio table of FIG. 30.

In the calculation formula (42), the setup time is set to 2 hours.

Moreover, the set number coefficient of the calculation formula (42) can be acquired from the design/program coefficient table (not shown). The design/program coefficient table associates each set number which indicates one piece, two pieces or four pieces, and the corresponding set number coefficient.

The processing unit 44 acquires the set number coefficient corresponding to the set number inputted from the set-number input item d4 of the main screen from the table.

The facility-specific machining related time of the calculation formula (42) means the value which added together all the necessary machining man-hours classified by facility as the necessary machining time classified by facility, and the necessary setup time classified by facility.

[Calculation of Break-Up Expense]

The processing unit 44 calculates the break-up expense by the estimate function stored in the storage unit 41 as the following calculation formulas (43) to (45).

$$\text{Break-up Expense}=(\text{breakup time})\times\{(\text{assembly (hand) facility/shared expense ratio})+(\text{assembly (hand) labor/shared expense ratio})\} \quad (43)$$

$$\text{Break-up Expanse}=(\text{breakup time})\times\{0.1\times(\text{assembly (die-spot, inversion machine) facility/shared expense ratio})+0.9\times(\text{assembly (hand) facility/shared expense ratio})+1.5\times(\text{assembly (hand) labor/shared expense ratio})\} \quad (44)$$

$$\text{Break-up Time}=(\text{tonnage-specific basic time})+(\text{slide part time}+\text{cavity side time}+\text{core side time})\times(\text{set number coefficient}) \quad (45)$$

When the tonnage of the injection molding machine which it is automatically displayed on the column of the appointed cost center of the process information screen, or the person who wants an estimate cost is 220 t or less, it is the calculation formula.

The break-up expense is calculated by the calculation formula (43). When the tonnage of the injection molding machine is 220 t or more, the break-up expense is calculated by the calculation formula (44).

As mentioned above, the tonnage of the injection molding machine which is determined automatically is displayed.

And the person who wants an estimate cost can also change the displayed tonnage of the injection molding machine.

The molding-machine tonnage table stored in the storage unit 41 performs automatic specification of the tonnage of the injection molding machine.

The contents of the molding-machine tonnage selection table are shown in FIG. 38.

The table associates the tonnage of the injection molding machine, each value of the depth of the projection area, the width, the length, and the product.

The processing unit 44 determines the molding-machine capacity from the value of the form which is inputted from the form input item a3 of the main screen, the value inputted from the product projection-area input item f7 of the product information screen, and each value of the length, the width and the depth, inputted from the dimensions input item f1. From the maximum of the determined molding-machine capacity, the processing unit 44 determines the tonnage of the injection molding machine which equips the modified die set as the estimated object.

The assembly facility/shared expense ratio and assembly labor/shared expense ratio of the calculation formula (43) can be acquired from the C/C machining expense ratio table of FIG. 30.

The assembly (die-spot, inversion machine) facility/shared expense ratio and assembly (die-spot, inversion machine) labor/shared expense ratio of the calculation formula (44) can be acquired from the C/C machining expense ratio table of FIG. 30.

The basic time classified by tonnage of the calculation formula (45), slide part time, the cavity side time, and core side time can be acquired from the break-up time table stored in the storage unit 41.

The contents of the break-up time table are shown in FIG. 39.

The table of FIG. 39 associates the tonnage of the injection molding machine, the basic time corresponding to the tonnage, slide part time, the cavity side time, and the core side time.

The tonnage of the injection molding machine can be acquired from the molding-machine tonnage selection table of FIG. 38.

Moreover, the set number coefficient can be acquired from the non-illustrated break-up expense set-number-coefficient table.

The break-up expense set-number-coefficient table associates each set number which takes, takes the two pieces and is taken the four pieces, and the set number coefficient corresponding to this.

Therefore, the processing unit 44 acquires the set number coefficient corresponding to the set number inputted from the set-number input item d4 of the main screen from the break-up expense set-number table while acquiring the basic time corresponding to the tonnage of the injection molding machine, the slide part time cavity side time, and core side time from the break-up time table of FIG. 39.

[Calculation of Assembly Expense Adjustment Expense]

The processing unit 44 calculates the assembly and arrangement expense by the estimate function stored in the storage unit 41 as the following calculation formulas (46) to (48).

Assembly/Arrangement Expense=(assembly/arrangement time)×{assembly (hand) facility/shared expense ratio+assembly (hand) labor/shared expense ratio}   (46)

Assembly/Arrangement Expense=(assembly/arrangement time)×{0.1×{assembly (die-spot, inversion machine) facility/shared expense ratio}+0.9×{assembly (hand) facility/shared expense ratio}+1.5×(assembly (hand) labor/shared expense ratio)}   (47)

Assembly/Arrangement Time=(breakup time)×1.5+(the number of new inserts)×0.5+(the number of insert pins)×0.1   (48)

When the tonnage of the injection molding machine which it is automatically displayed on the column of the appointed cost center of the process information screen or the person who wants an estimate cost is 220 t or less, the assembly and arrangement expense is calculated by the calculation formula (46).

When the tonnage of the injection molding machine is 280 t or more, the assembly and arrangement expense is calculated by the calculation formula (47).

The assembly (hand) facility/shared expense ratio and the assembly (hand) labor/shared expense ratio of the calculation formulas (46) and (47) can be acquired from the C/C machining expense ratio table of FIG. 30.

The number of the new inserts of the calculation formula (48) is incremented every time one machining pattern of the new insert, the louver shape, or the material lists is selected at the above step S11. Moreover, the number of the insert pins of the calculation formula (48) is counted every time the machining pattern of the round-hole shape is chosen at the step S11.

[Calculation of Measurement Expense]

The processing unit 44 calculates measurement expense by the estimate function stored in the storage unit 41 as the following calculation formulas (49) and (51).

Measurement Expense=(measurement time)×(measuring facility/shared expense ratio+measuring labor/shared expense ratio)(49)

Measurement Time=(tonnage-specific setup time)+{Σ(modification part length+width)×0.01×(the number of places)}×(set number coefficient)×(need-of-support coefficient)   (50)

The measuring facility/shared expense ratio and measuring labor/shared expense ratio of the calculation formula (49) can be acquired from the C/C machining expense ratio table of FIG. 30.

The setup time according to ton of the calculation formula (50) can be acquired from the setup-time table classified by tonnage stored in the storage unit 41.

The contents of the above table are shown in FIG. 40A.

The table associates the tonnage of the injection molding machine, and the setup time corresponding to this.

The tonnage corresponds with the tonnage of the injection molding machine which it is automatically displayed on the column of the appointed cost center of the process information screen, or the person who wants an estimate cost.

Moreover, the set number coefficient of the calculation formula (50) can be acquired from the non-illustrated measurement expense set-number-coefficient table.

The table associates each set number which takes, takes the two pieces and is taken the four pieces, and the set number coefficient corresponding to this.

Furthermore, the need-of-support factor of the calculation formula (50) can be acquired from the need-of-support-factor table stored in the storage unit 41.

The contents of the above table are shown in FIG. 40B.

The table of FIG. 40B associates the existence of specification of the need-of-support component, and the need-of-support factor corresponding to this.

Moreover, the modification part length of the calculation formula (50), the modification part width, and the number-of-places use the value inputted from the L-value input item i5 of the die cost information screen and the W-value input item i6, and the modification number-of-places input item i8, respectively.

[Calculation of Try Expense]

The processing unit 44 calculates the try expense by the estimate functions stored in the storage unit 41 in accordance with the following formulas (51) and (52).

Try Expense=try hour×(molding-machine facility/shared expense ratio+molding-machine labor/shared expense ratio)   (51)

Try Hour=(unit try hour)×(the number of tries)   (52)

The molding-machine facility/shared expense ratio and molding-machine labor/shared expense ratio of the calculation formula (51) can be acquired from the C/C machining expense ratio table classified by injection-molding-machine tonnage of the machining expense stored in the storage unit.

The contents of the machining-expense generalization table classified by injection-molding-machine tonnage are shown in FIG. 41.

The table of FIG. 41 associates the weight of the injection molding machine equipped with the modified die, and the corresponding molding-machine facility/shared expense ratio and the corresponding molding-machine labor/shared expense ratio.

Not only the molding-machine facility/shared expense ratio and molding-machine labor/shared expense ratio per hour but the molding-machine facility/shared expense ratio and molding-machine labor/shared expense ratio which are converted into per second define the table of FIG. 41.

The facility/shared expense ratio and labor/shared expense ratio per hour are used for calculation of the facility and shared expense which the setup expense classified by facility using the calculation formula (51) calculates and mentions later, and the labor and shared expense.

The try hour means the time (try hour) which the try work by the machine takes, and the time which combined the time (try man-hour) which the try work by the help takes.

The unit try hour of the calculation formula (52) is the sum of the value of the unit try hour and the value of the unit try man-hour which are read from the unit try hour/try man-hour table stored in the storage unit 41.

The contents of the unit try hour/try man-hour table are shown in FIG. 42A.

The table of FIG. 42A associates the try unit time corresponding to this, and the unit try man-hour (both units are time) the molding-machine capacity exception of the molding machine.

Moreover, the number of tries of the calculation formula (52) can be acquired from the try number table stored in the storage unit 41.

The contents of the above table are shown in FIG. 42B.

The table of FIG. 42B defines correlation with the existence of the 0 or first class specification of the part and the need-of-support classification of the geometric tolerance specification part and appearance appointed side, and the number of tries corresponding to these.

When the 0 or first class selection of the part or the geometric tolerance appointed side of the appearance appointed side and dimension grade is made on the ease-of-modification input-item i2 of the die cost information screen, or when the "yes" is chosen in the need-of-support input item, the processing unit 44 determines the corresponding number of tries.

When neither of the selections is made, the number of tries corresponding to common counts other than the above is chosen.

[Calculation of the Try-Material Expense]

The processing unit 44 calculates the try-material expense by the estimate function stored in the storage unit 41 as the following calculation formulas (53) and (54).

$$\text{Try Material Expense} = (\text{try material weight}) \times (\text{material unit price})/1000 \quad (53)$$

$$\text{Try Material Weight} = \text{material substitute weight} + (\text{product weight} + \text{spool runner weight}) \times \text{set number} \times 50 \quad (54)$$

The material unit price of the calculation formula (53) can be acquired from the material unit price database (not shown).

The table defines each material unit price corresponding to the form cord inputted from the material code-input column c2 of the main screen.

The material substitute weight of the calculation formula (54) can be acquired from the material substitute weight table stored in the storage unit 41.

The contents of the material substitute weight table are shown in FIG. 43.

The table associates the capacity (tonnage) of the injection molding machine and the corresponding material substitute weight (g).

The set number as which the spool runner weight as which the product weight as which the product weight of the calculation formula (54) is inputted from the product weight input item f3 of the material information screen is inputted into the spool runner weight from the spool runner weight input item f4 of the material information screen is inputted into the set number from the set-number input item d4 of the main screen is used, respectively.

[Calculation of Material Administrative Expenses]

The processing unit 44 calculates the material administrative expenses by the estimate function stored in the storage unit 41 as the following calculation formula (55).

$$\text{Material Administrative Expense} = (\text{steel exp.} + \text{e.d. electrode exp.} + \text{purchase standard-item exp.} + \text{nitriding exp.} + \text{try material exp}) \times \text{material-administrative-expense ratio} \quad (55)$$

The material-administrative-expense ratio of the calculation formula (55) is set to 6.3 (%).

[Calculation of the General Management Sales Expense]

The processing unit 44 calculates the general management sales expense by the estimate function stored in the storage unit 41 as the following calculation formula (56).

$$\text{General Management Sales Expense} = (\text{design/program exp.} + \text{machining exp.} + \text{polishing exp.} + \text{breakup exp.} + \text{assembly/arrangement exp.} + \text{try exp.} + \text{measuring exp.}) \times \text{general-management-sales-expense ratio} \quad (56)$$

The general-management-sales-expense ratio of the calculation formula (56) is set to 11.2 (%).

[Calculation of the Profits Expense]

The processing unit 44 calculates the profits expense by the estimate function stored in the-storage unit 41 as the following calculation formula (57).

$$\text{Profits Expense} = \{(\text{design/program exp.} + \text{machining exp.} + \text{polishing exp.} + \text{breakup exp.} + \text{assembly/arrangement exp.} + \text{try exp.} + \text{measuring exp.}) + \text{material administrative exp.} + \text{general management sales exp.}\} \times \text{profit ratio} \quad (57)$$

The profit ratio of the calculation formula (57) is set to 5 (%).

The estimated cost for every cost items calculated according to the above calculation procedure is displayed on the die-modification expense calculation list screen shown in FIG. 9.

Therefore, the person who wants an estimate cost can grasp not only the total amount of the estimated cost corresponding to the specified contents of the modification but also each items of the material expense, the disposal cost, the design/program expense, the machining expense, the polishing expense, the break-up expense, the assembly and arrangement expense, the try expense, the measurement expense, the try-material expense, the general management sales expense, the material-control distribution cost, and the profits expense.

Moreover, the necessary setup time calculated in the middle process of calculation of the machining expense, the necessary machining time, and the machining related time which is the sum total of the necessary machining man-hour are also displayed on the die-modification expense calculation list screen.

Therefore, the person who wants an estimate cost can grasp the required time for operation of the die machining facility corresponding to the specified contents of the modification.

According to the present invention, the die modification estimate system and program can quickly output a reliable modification cost according to the contents of the modification specified by the person who wants an estimate cost.

The present invention is not limited to the above-described embodiments, and variations and modifications may be made without departing from the scope of the present invention.

Further, the present invention is based on Japanese priority application No. 2002-179687, filed on Jun. 20, 2002, the entire contents of which are hereby incorporated by reference.

What is claimed is:

1. A die modification estimate system including an input unit, an output unit and a storage unit, comprising:
    a first unit acquiring contents of modification of a die specified by using the input unit;
    a second unit reading respective reference values for cost estimation according to the specified contents of the die modification, from the storage unit;
    a third unit reading respective estimate functions of cost items according to the specified contents of the die modification, from the storage unit;
    a fourth unit calculating an estimated cost of each of the cost items based on a corresponding one of the reference values and a corresponding one of the estimate functions respectively;
    a fifth unit storing the estimated costs calculated by the fourth unit, in the storage unit;
    a sixth unit calculating a total amount of the estimated costs read from the storage unit; and a seventh unit outputting the total amount of the estimated costs to the output unit.

2. The die modification estimate system of claim 1 wherein the fourth unit is provided to calculate an estimated cost of each of material expense, nitriding expense, design and program expense, machining expense, polishing expense, break-up expense, assembly and arrangement expense, try expense, measuring expense, try material expense, general management sales expense, material administrative expense, and profits expense based on the reference values and the estimate functions.

3. The die modification estimate system of claim 1 further comprising an eighth unit outputting the respective the estimated costs read from the storage unit, to the output unit.

4. A die modification estimate system including an input unit, an output unit and a storage unit, comprising:
   a first unit acquiring contents of modification of a die specified by using the input unit;
   a second unit reading respective machining patterns according to the specified contents of the die modification, from a machining pattern table of the storage unit;
   a third unit reading a machining item identifier and a machining-time-calculation reference value according to each of the respective machining patterns, from a machining-pattern-specific calculation condition table of the storage unit;
   a fourth unit reading a machining-time estimate function according to each of the machining item identifiers from the storage unit respectively;
   a fifth unit calculating an estimated machining time of each of machining items based on a corresponding one of the reference values and a corresponding one of the estimate functions respectively; and
   a sixth unit storing the respective estimated machining times calculated by the fifth unit, in the storage unit.

5. The die modification estimate system of claim 4 wherein a first correlation between the machining-item identifiers and corresponding machining facility identifiers is stored in the storage unit, the die modification estimate system further comprising:
   a unit determining a machining facility identifier according to each of the machining-item identifiers read from the calculation condition table of the storage unit, based on the first correlation stored in the storage unit;
   a unit calculating an estimated machining time for each of the determined machining facility identifiers by summing the machining times calculated by the fifth unit, with respect to each of the determined machining facility identifiers; and
   a unit storing the respective estimated machining times for the machining facility identifiers in the storage unit.

6. The die modification estimate system of claim 5 wherein a second correlation between the machining facility identifiers and corresponding setup-time-calculation reference values, and setup time estimate functions to calculate respective setup times for the machining facility identifiers are stored in the storage unit, the die modification estimate system further comprising:
   a unit reading a setup-time-calculation reference value according to each of the machining-item identifiers from the storage unit based on the second correlation;
   a unit calculating an estimated setup time of each of the machining items based on the read setup-time-calculation reference values and the setup time estimate functions of the storage unit;
   a unit calculating an estimated setup time for each of the determined machining facility identifiers by summing the estimated setup times of the machining items, with respect to each of the determined machining facility identifiers; and
   a unit storing the respective estimated setup times for the machining facility identifiers in the storage unit.

7. The die modification estimate system of claim 6 wherein working time estimate functions to calculate respective working times for the machining facility identifiers are stored in the storage unit, the die modification estimate system further comprising:
   a unit reading the working time estimate functions from the storage unit;
   a unit calculating a working time of each of the machining items based on a corresponding one of the estimated machining times and a corresponding one of the working time estimate functions;
   a unit calculating an estimated working time for each of the determined machining facility identifiers by summing the estimated working times of the machining items, with respect to each of the determined machining facility identifiers; and
   a unit storing the respective working times for the machining facility identifiers in the storage unit.

8. The die modification estimate system of claim 7 wherein a facility-machining-expense estimate function to calculate a facility machining expense based on the machining times, a facility-setup-expense estimate function to calculate a facility setup expense based on the setup times, and a facility-working-expense estimate function to calculate a facility working expense based on the working times are stored in the storage unit, the die modification estimate system further comprising:
   a unit reading the facility-machining-expense estimate function from the storage unit;
   a unit calculating the facility machining expense based on the facility-machining-expense estimate function and the machining times for the machining facility identifiers;
   a unit reading the facility-setup-expense estimate function from the storage unit;
   a unit calculating the facility setup expense based on the facility-setup-expense estimate function and the setup times for the machining facility identifiers;
   a unit reading the facility-working-expense estimate function from the storage unit;
   a unit calculating the facility working expense based on the facility-working-expense estimate function and the working times for the machining facility identifiers;
   a unit calculating an estimated machining cost of the die modification by summing the facility machining expense, the facility setup expense and the facility working expense; and
   a unit storing the calculated estimated machining cost of the die modification in the storage unit.

9. The die modification estimate system of claim 7 further comprising:
   a unit reading the machining times for the machining facility identifiers from the storage unit;
   a unit reading the setup times for the machining facility identifiers from the storage unit;
   a unit reading the working times for the machining facility identifiers from the storage unit;

a unit calculating an machining-related time for each of the machining facility identifiers by summing the machining times, the setup times and the working times, with respect to each of the machining facility identifiers;

a unit storing the calculated machining-related times for the machining facility identifiers in the storage unit; and a unit outputting the machining-related times for the machining facility identifiers read from the storage unit, to the output unit.

10. A computer program embodied therein for causing a processing unit of a die modification estimate system to execute a die modification estimate process, the die modification estimate system including an input unit, an output unit and a storage unit, the process comprising steps of:

acquiring contents of modification of a die specified by using the input unit;

reading respective reference values for cost estimation according to the specified contents of the die modification, from the storage unit;

reading respective estimate functions of cost items according to the specified contents of the die modification, from the storage unit;

calculating an estimated cost of each of the cost items based on a corresponding one of the reference values and a corresponding one of the estimate functions respectively;

storing the estimated costs calculated in, the calculating step, in the storage unit;

calculating a total amount of the estimated costs read from the storage unit; and outputting the total amount of the estimated costs to the output unit.

11. The computer program of claim 10 wherein the first calculating step is provided to calculate an estimated cost of each of material expense, nitriding expense, design and program expense, machining expense, polishing expense, break-up expense, assembly and arrangement expense, try expense, measuring expense, try material expense, general management sales expense, material administrative expense, and profits expense based on the reference values and the estimate functions.

12. The computer program of claim 10 wherein the process further comprises the step of outputting the respective the estimated costs read from the storage unit, to the output unit.

13. A computer program embodied therein for causing a processing unit of a die modification estimate system to execute a die modification estimate process, the die modification estimate system including an input unit, an output unit and a storage unit, the process comprising steps of:

acquiring contents of modification of a die specified by using the input unit;

reading respective machining patterns according to the specified contents of the die modification, from a machining pattern table of the storage unit;

reading a machining item identifier and a machining-time-calculation reference value according to each of the respective machining patterns, from a machining-pattern-specific calculation condition table of the storage unit;

reading a machining-time estimate function according to each of the machining item identifiers from the storage unit respectively;

calculating an estimated machining time of each of machining items based on a corresponding one of the reference values and a corresponding one of the estimate functions respectively; and storing the respective estimated machining times of the machining items in the storage unit.

14. The computer program of claim 13 wherein a first correlation between the machining-item identifiers and corresponding machining facility identifiers is stored in the storage unit, the process further comprising steps of:

determining a machining facility identifier according to each of the machining-item identifiers read from the calculation condition table of the storage unit, based on the first correlation stored in the storage unit;

calculating an estimated machining time for each of the determined machining facility identifiers by summing the machining times calculated by the fifth unit, with respect to each of the determined machining facility identifiers; and storing the respective estimated machining times for the machining facility identifiers in the storage unit.

15. The computer program of claim 14 wherein a second correlation between the machining facility identifiers and corresponding setup-time-calculation reference values, and setup time estimate functions to calculate respective setup times for the machining facility identifiers are stored in the storage unit, the process further comprising steps of:

reading a setup-time-calculation reference value according to each of the machining-item identifiers from the storage unit based on the second correlation;

calculating an estimated setup time of each of the machining items based on the read setup-time-calculation reference values and the setup time estimate functions of the storage unit;

calculating an estimated setup time for each of the determined machining facility identifiers by summing the estimated setup times of the machining items, with respect to each of the determined machining facility identifiers; and storing the respective estimated setup times for the machining facility identifiers in the storage unit.

16. The computer program of claim 15 wherein working time estimate functions to calculate respective working times for the machining facility identifiers are stored in the storage unit, the process further comprising steps of:

reading the working time estimate functions from the storage unit;

calculating a working time of each of the machining items based on a corresponding one of the estimated machining times and a corresponding one of the working time estimate functions;

calculating an estimated working time for each of the determined machining facility identifiers by summing the estimated working times of the machining items, with respect to each of the determined machining facility identifiers; and storing the respective working times for the machining facility identifiers in the storage unit.

17. The computer program of claim 16 wherein a facility-machining-expense estimate function to calculate a facility machining expense based on the machining times, a facility-setup-expense estimate function to calculate a facility setup expense based on the setup times, and a facility-working-expense estimate function to calculate a facility working expense based on the working times are stored in the storage unit, the process further comprising steps of:

reading the facility-machining-expense estimate function from the storage unit;

calculating the facility machining expense based on the facility-machining-expense estimate function and the machining times for the machining facility identifiers;

reading the facility-setup-expense estimate function from the storage unit;

calculating the facility setup expense based on the facility-setup-expense estimate function and the setup times for the machining facility identifiers;

reading the facility-working-expense estimate function from the storage unit;

calculating the facility working expense based on the facility-working-expense estimate function and the working times for the machining facility identifiers;

calculating an estimated machining cost of the die modification by summing the facility machining expense, the facility setup expense and the facility working expense; and storing the calculated estimated machining cost of the die modification in the storage unit.

18. The computer program of claim 16 wherein the process further comprises steps of:

reading the machining times for the machining facility identifiers from the storage unit;

reading the setup times for the machining facility identifiers from the storage unit;

reading the working times for the machining facility identifiers from the storage unit;

calculating an machining-related time for each of the machining facility identifiers by summing the machining times, the setup times and the working times, with respect to each of the machining facility identifiers;

storing the calculated machining-related times for the machining facility identifiers in the storage unit; and outputting the machining-related times for the machining facility identifiers read from the storage unit, to the output unit.

* * * * *